United States Patent

Kazami et al.

[11] Patent Number: 5,264,883
[45] Date of Patent: * Nov. 23, 1993

[54] CONTROLLER FOR CAMERA

[75] Inventors: Kazuyuki Kazami; Toshiyuki Nakamura; Koichi Daitoku; Hidemori Miyamoto; Hiroshi Wakabayashi, all of Tokyo, Japan

[73] Assignee: Nikon Corporation, Tokyo, Japan

[*] Notice: The portion of the term of this patent subsequent to Jan. 23, 2007 has been disclaimed.

[21] Appl. No.: 707,922

[22] Filed: May 28, 1991

Related U.S. Application Data

[63] Continuation of Ser. No. 447,575, Dec. 7, 1989, abandoned, which is a continuation-in-part of Ser. No. 301,050, Jan. 24, 1989, Pat. No. 4,896,177.

[30] Foreign Application Priority Data

| Jan. 27, 1988 | [JP] | Japan | 63-18459 |
| May 24, 1988 | [JP] | Japan | 63-127681 |
| Oct. 24, 1988 | [JP] | Japan | 63-268702 |
| Nov. 4, 1988 | [JP] | Japan | 63-280065 |

[51] Int. Cl.$^5$ .................... G03B 5/00; G03B 15/05; G03B 17/38
[52] U.S. Cl. ............... 354/127.11; 354/195.1; 354/266
[58] Field of Search ........... 354/195.1, 195.11, 195.12, 354/266, 268, 127.13, 418, 127.1, 127.11, 127.12, 199, 222, 145.1

[56] References Cited

U.S. PATENT DOCUMENTS

| 3,373,671 | 3/1968 | Jakob | 354/195.1 X |
| 3,605,596 | 9/1971 | Vockenhuber et al. | 354/195.1 |
| 4,203,661 | 5/1980 | Besenmatter | 354/195.11 X |
| 4,290,679 | 9/1981 | Vockenhuber | 354/268 X |
| 4,712,902 | 12/1987 | Hosomizu | 354/127.13 X |
| 4,731,629 | 3/1988 | Aoshima et al. | 354/266 X |
| 4,740,807 | 4/1988 | Hoshino et al. | 354/195.1 X |
| 4,755,845 | 7/1988 | Taniguchi et al. | 354/127.13 X |
| 4,777,508 | 10/1988 | Aoshima | 354/195.1 X |
| 4,792,822 | 12/1988 | Akiyama et al. | 354/195.12 X |
| 4,942,417 | 7/1990 | Miyazawa et al. | 354/195.1 X |
| 4,951,075 | 8/1990 | Takumara et al. | 354/195.1 X |

FOREIGN PATENT DOCUMENTS

| 53-113527 | 10/1978 | Japan . |
| 58-103273 | 6/1983 | Japan . |
| 63-131112 | 6/1988 | Japan . |
| 63-220118 | 9/1988 | Japan . |

Primary Examiner—W. B. Perkey
Attorney, Agent, or Firm—Shapiro and Shapiro

[57] ABSTRACT

A controller for a camera is provided with a first zoom signal output device operatively associated with the half depressing operation of a release operation member and outputting a first zoom signal for directing a photographing lens to a focal length preset on the camera, a second zoom signal output device outputting a second zoom signal for arbitrarily varying the focal length of the photographing lens by a manual operation, a drive device responsive to the first or second zoom signal to electrically drive the photographing lens and effect zooming, a mode command device for commanding the setting and release of an auto focal length mode in which the focal length of the photographing lens is changed with the first zoom signal, by a manual operation, and a control device for operating the first zoom signal output device by the first half depressing operation of the release operation member when the auto focal length mode is set, and releasing the auto focal length mode when the second zoom signal is output during the time from after the half depressing operation is released until the next shutter release, and thereafter inhibiting the operation of the first zoom signal output device until the shutter release is effected even if the half depressing operation is done.

25 Claims, 28 Drawing Sheets

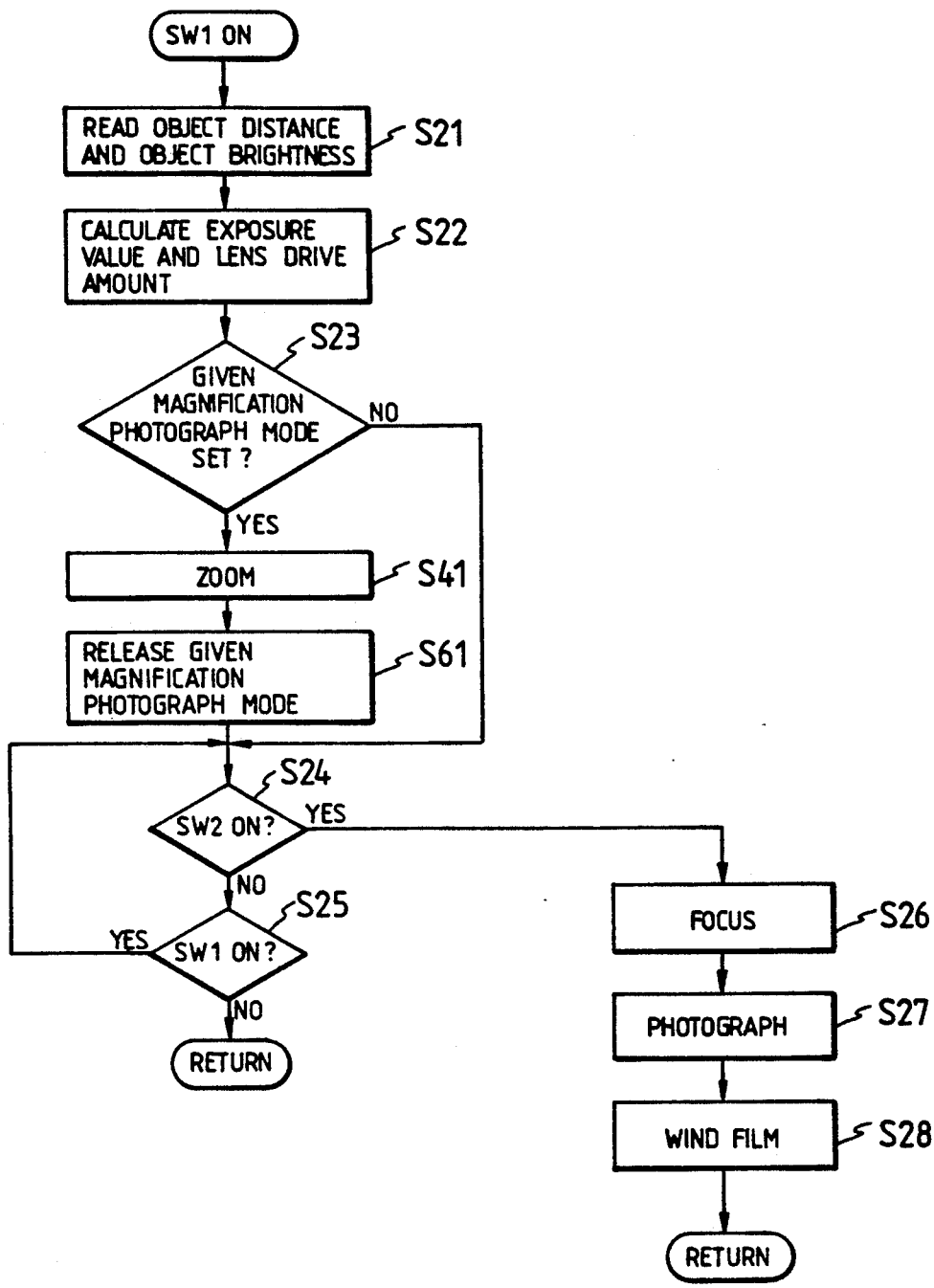

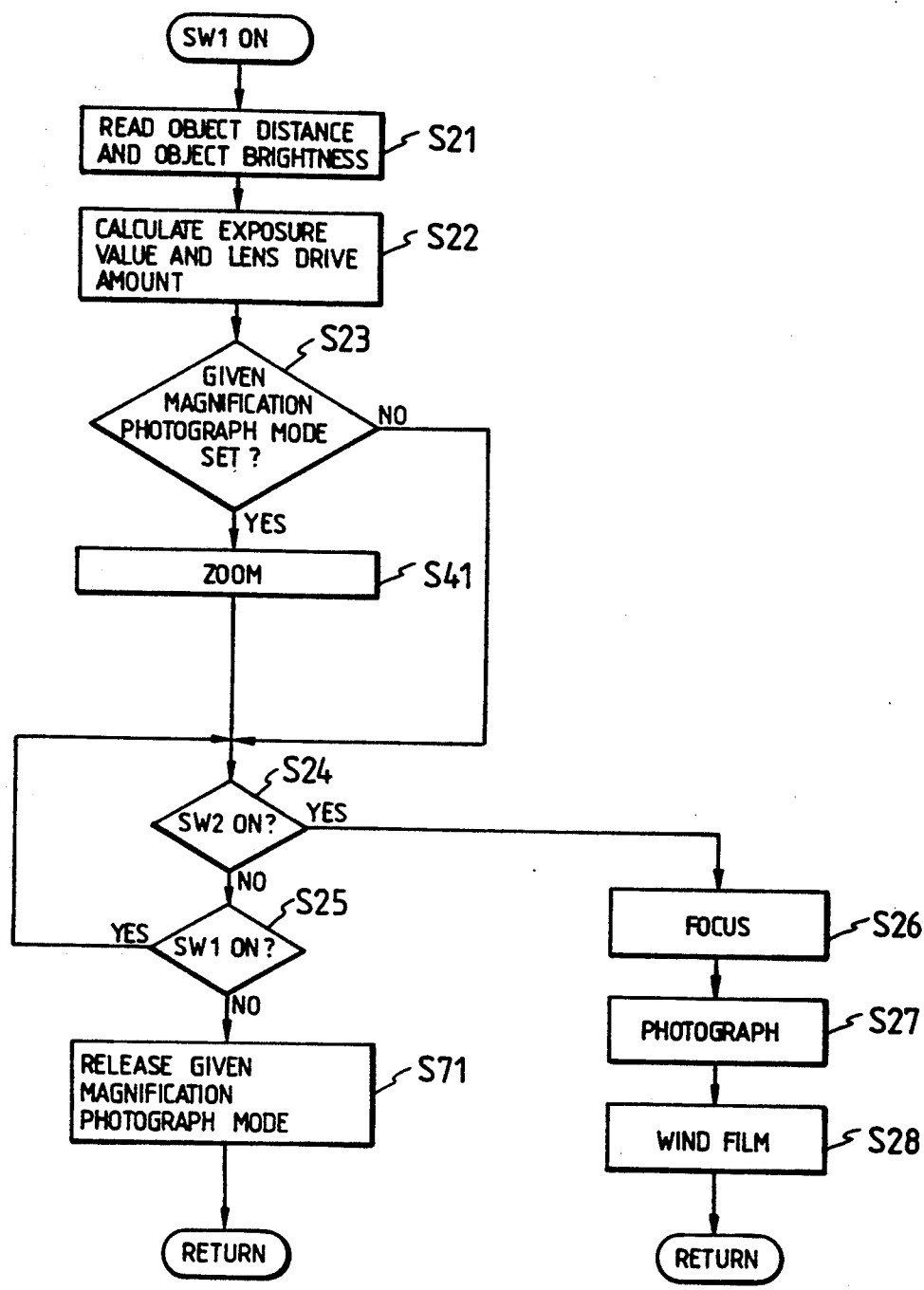

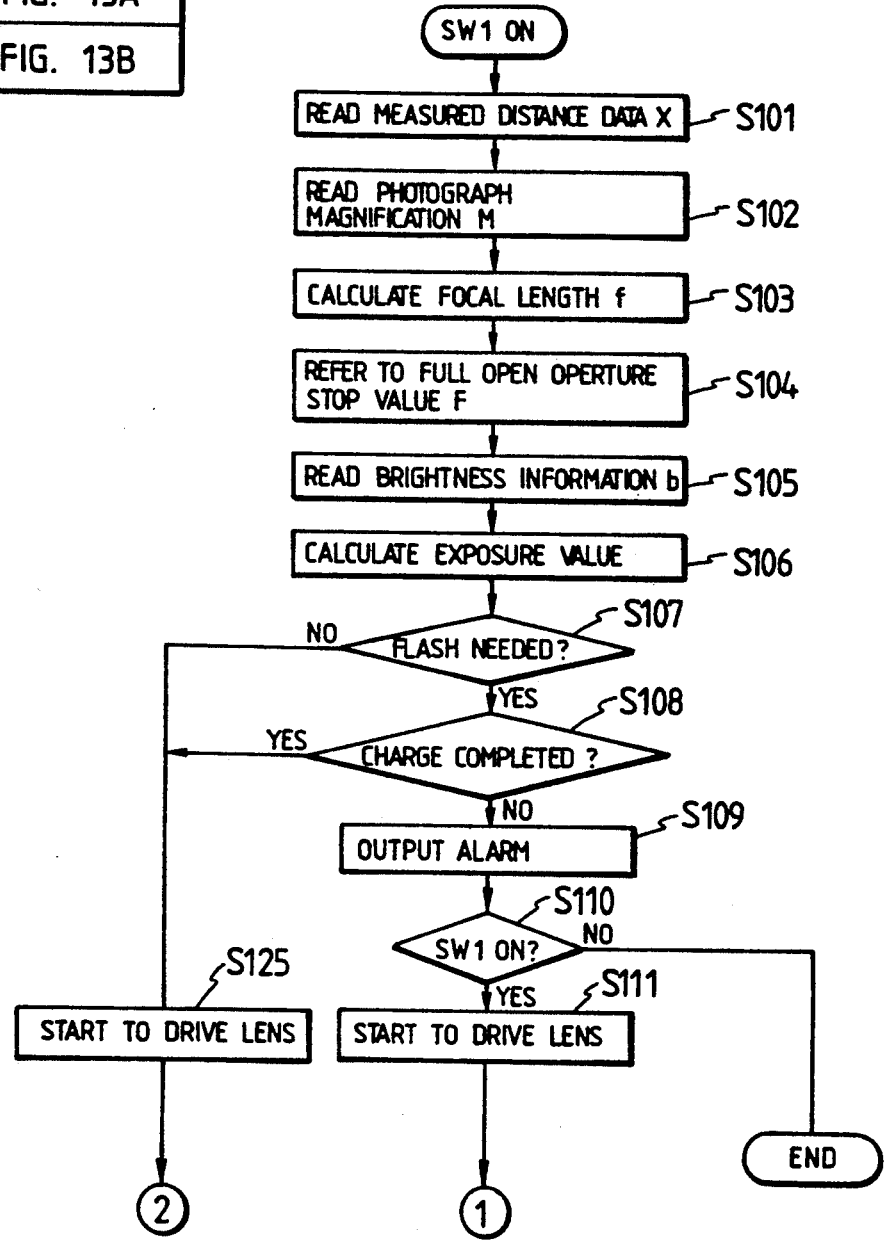

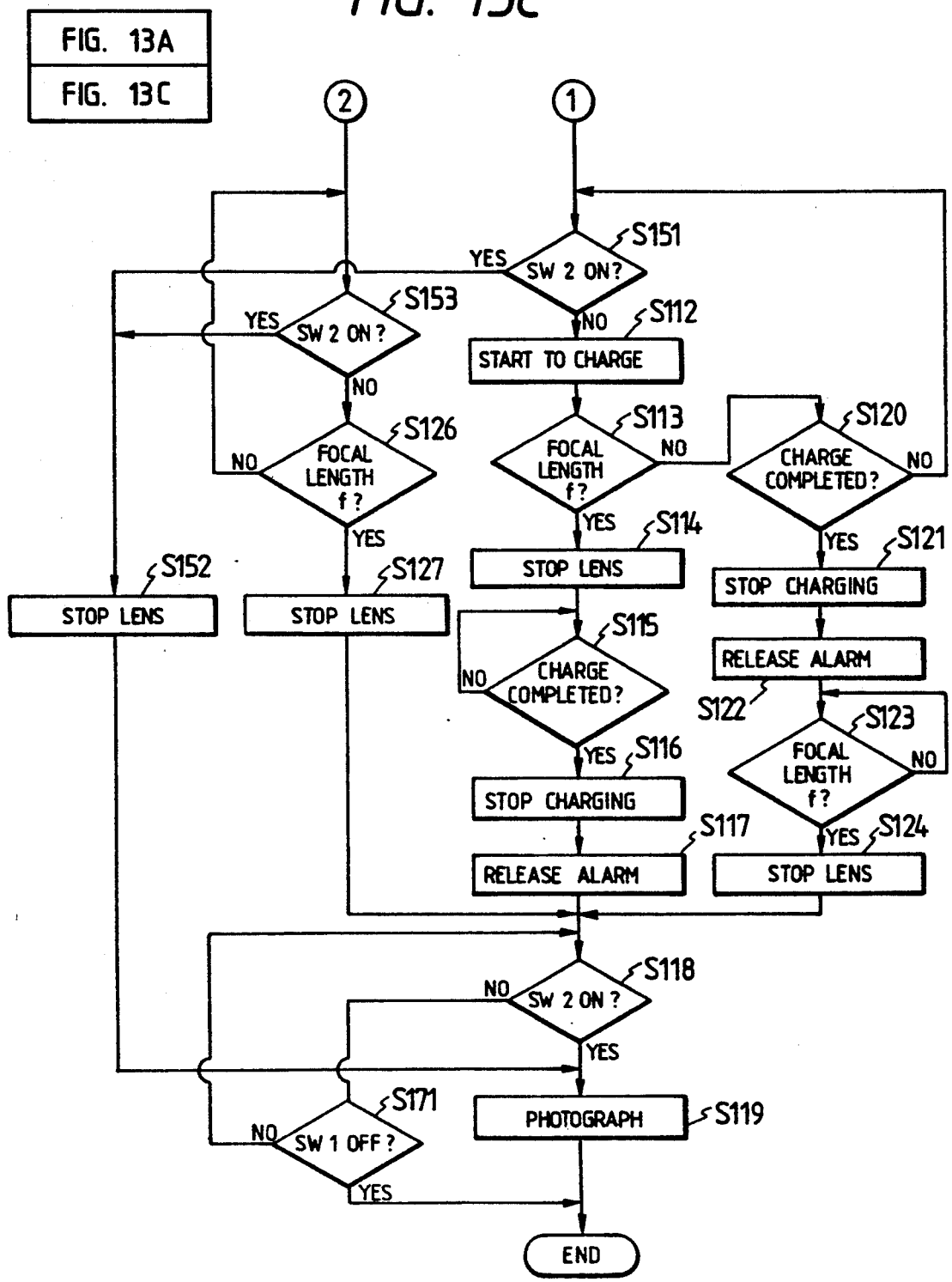

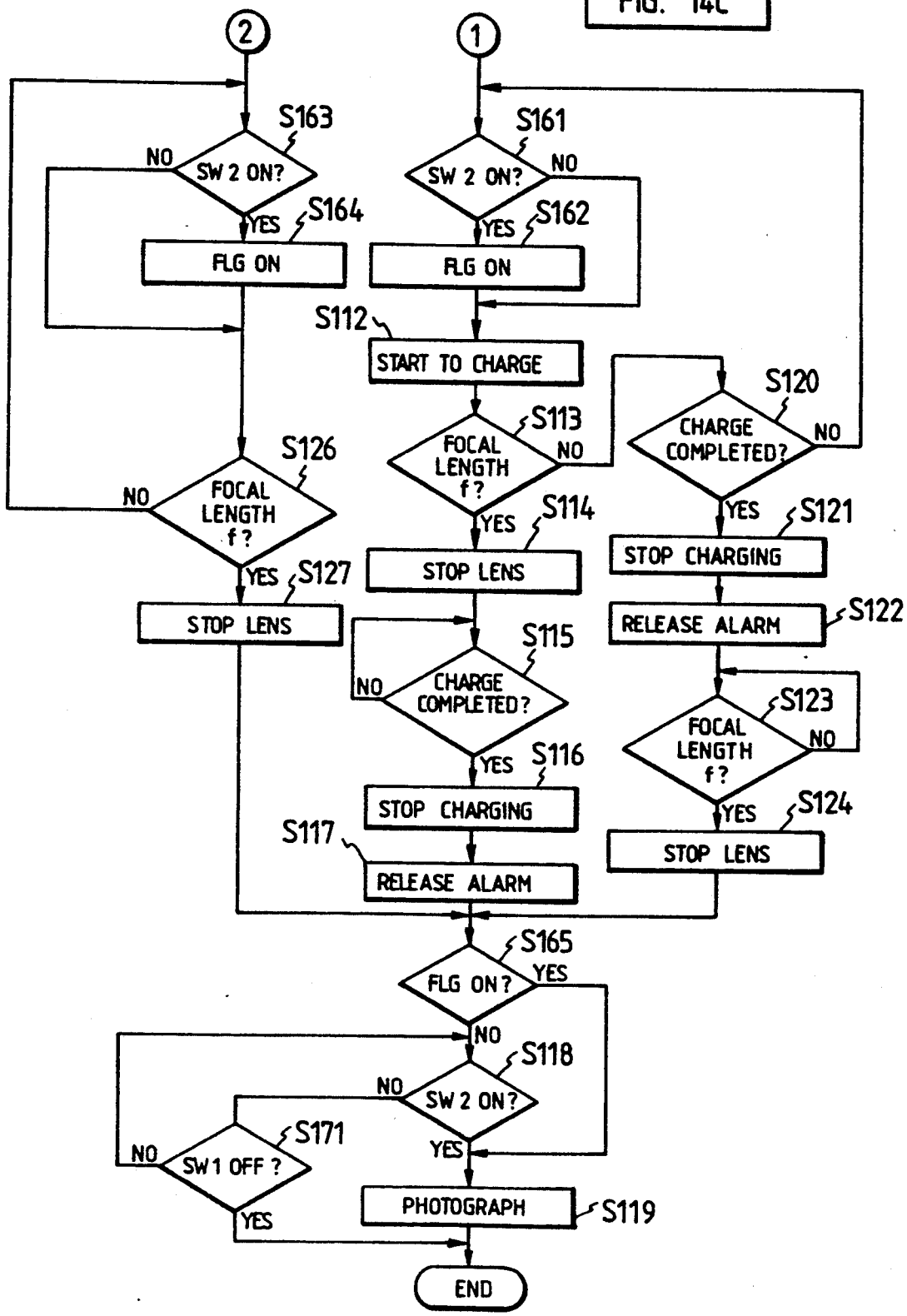

CONTROLLER FOR CAMERA

This is a continuation of application Ser. No. 447,575 filed Dec. 7, 1989 (now abandoned), which is a continuation-in-part of application Ser. No. 301,050 filed Jan. 24, 1989 (now U.S. Pat. No. 4,896,177 issued Jan. 23, 1990).

BACKGROUND OF THE INVENTION

1. Field of the Invention

This invention relates to a controller for a camera.

2. Related Background Art

An electric zoom camera capable of accomplishing so-called given magnification photography in which an object is photographed always at a predetermined size irrespective of the object distance by operating a given magnification setting button or the like has been proposed.

In the camera of this type, a plurality of magnification tables in which the object distance and the focal length are made to correspond to each other in advance are stored in CPU to change the focal length of the photographing lens in conformity with the object distance and make given magnification photography possible. By half depressing a release button after the given magnification photographing mode is set by the operation of the given magnification setting button, one of the tables is selected in the camera, and from that table, for example, a focal length corresponding to the object distance obtained by a distance measurement circuit is selected and set and the photographing lens is automatically driven to that focal length, and photographing is effected by the half depressing operation of the release button. In such magnification tables, the ratio of the object distance to the focal length, i.e., the photograph magnification is always made constant so that for example, the bust or the whole of a person is photographed always at the same size, and the photographer can also select the photograph magnification by the operation of an operating button or the like.

Also known is a camera in which a desired focal length is input in advance to the camera by a manual operation and when the half depression operation of a release button is thereafter effected, a photographing lens is driven at a stroke to the input focal length.

However, in such a camera, when for example, a mode in which given magnification photography is effected is set, the camera automatically sets the focal length of the photographing lens and effects zooming, and therefore it is sometimes the case that the composition is not satisfactory to the photographer, and this is disadvantageous.

Also known is a camera in which as disclosed, for example, in Japanese Patent Publication No. 51-27577, the focal length of a photographing lens such as a zoom lens is automatically adjusted so that a predetermined photograph magnification is always provided even if the photographing distance varies for the same object.

Now, in a photographing lens capable of photographing at a plurality of focal lengths, such as a zoom lens, the full open aperture stop value differs with a variation in the focal length and therefore, for example, where the zoom lens is driven to the telephoto side, in spite of the fact that before the driving, it is not necessary to cause a flash device to emit light for the same composition, the full open aperture stop value becomes greater (e.g., F2→F5.6) after the driving and the necessity of light emission sometimes arises. Hereinafter, the light emission by the flash device will be referred to as flash light emission.

In the conventional camera, after the zoom lens is driven to a predetermined focal length, calculation of an exposure value is effected by the use of a full open aperture stop value conforming to that focal length. Accordingly, whether flash light emission is necessary after the driving of the photographing lens can be known, and when flash light emission is necessary, charging is started at that point of time. Since photographing cannot be accomplished until charging is complete, in spite of the lens having been set to the predetermined focal length, this delay may displease to the photographer.

OBJECTS AND SUMMARY OF THE INVENTION

It is an object of the present invention to provide a zooming controller for a camera capable of photographing at an intended focal length even during the setting of the mode as described above.

It is another object of the present invention to provide an operation controller for a camera capable of photographing on the spot after the focal length is changed.

Describing the present invention with reference to FIG. 1A of the accompanying drawings, a zooming controller is provided with first zoom signal output means 102 operatively associated with the half depressing operation of a release operation member 101 and outputting a first zoom signal for directing a photographing lens LE to a focal length preset on the camera second zoom signal output means 103 outputting a second zoom signal for arbitrarily varying the focal length of the photographing lens LE by a manual operation, drive means 104 responsive to the first or second zoom signal to electrically drive the photographing lens LE and effect zooming, mode command means 105 for commanding the setting and release of an auto focal length mode in which the focal length of the photographing lens LE is changed with the first zoom signal, by a manual operation, and control means 106 for operating the first zoom signal output means by the first half depressing operation of the release operation member 101 when the auto focal length mode is set, and releasing the auto focal length mode when the second zoom signal is output during the time from after the half depressing operation is released until the next shutter release, and thereafter unhibiting the operation of the first zoom signal output means 102 until the shutter release is effected even if the half depressing operation is done.

Also, describing the present invention with reference to FIG. 1B of the accompanying drawings a zooming controller has the above-described first zoom signal output means 102, the above-described second zoom signal output means 103, the above-described drive means 104 and the above-described mode command means 105, and the control means 206 which functions as follows: it operates the first zoom signal output means 102 by the first half depressing operation of the release operation member 101 when the auto focal length mode is set, and releases the auto focal length mode in response to the drive means 104 being operated by the first zoom signal resulting from said operation, and thereafter inhibits the operation of the first zoom signal output means 102 until the auto focal length mode is re-set even if the half depressing operation is again performed, and operates the drive means 104 when the second zoom signal is output.

Further, describing the present invention with reference to FIG. 1C of the accompanying drawings a zooming controller has the above-described first zoom signal output means 102, the above-described second zoom signal output means 103, the above-described drive means 104 and the above-described mode command means 105, and the control means 306 which functions as follows: it operates the first zoom signal output means 102 by the first half depressing operation of the release operation member 101 when the auto focal length mode is set, and releases the auto focal length mode in response to said half depressing operation being released without shutter release being effected, and thereafter inhibits the operation of the first zoom signal output means 102 until the auto focal length mode is re-set even if the half depressing operation is again performed, and operates the drive means 104 when the second zoom signal is output.

(1) The apparatus according to the invention of FIG. 1A:

When the auto focal length mode is set, the control means 106 operates the first zoom signal output means 102 by the first half depressing operation of the release operation member 101 and effects zooming at a stroke to a predetermined focal length. Thereafter, when the second zoom signal is output during the time from after the half depressing operation is released until the next shutter release is effected, the auto focal length mode is released. As a result, the operation of the first zoom signal output means 102 is inhibited until the next shutter release is effected even if the half depressing operation is performed, and the focal length of the photographing lens LE is fixed.

(2) The apparatus according to the invention of FIG. 1B:

When the auto focal length mode is set, the control means 206 operates the first zoom signal output means 102 by the first half depressing operation of the release operation member 101. The auto focal length mode is released in response to the drive means 104 effecting zooming by the first zoom signal. When the second zoom signal is output after said release, the drive means 104 is operated to effect arbitrary zooming. Thereafter, the operation of the first zoom signal output means 102 is inhibited until the auto focal length mode is re-set even if the half depressing operation is again performed, and the focal length of the photographing lens LE is fixed.

(3) The apparatus according to the invention of FIG. 1C:

When the auto focal length mode is set, the control means 306 operates the first zoom signal output means 102 by the first half depressing operation of the release operation member 101 and effects zooming at a stroke to a predetermined focal length. Thereafter, when the half depressing operation is released without shutter release being effected, the auto focal length mode is released. When the second zoom signal is output after said release, the drive means 104 is operated to effect zooming. Thereafter, the operation of the first zoom signal output means 102 is inhibited until the auto focal length mode is re-set even if the half depressing operation is again performed, and the focal length of the photographing lens LE is fixed.

(4) The apparatus according to the invention of FIG. 8:

Describing the present invention with reference to FIG. 8 of the accompanying drawings an operation controller for a camera according to the present invention is provided with photometry means 801 outputting brightness information regarding the brightness of an object, focal length output means 802 outputting a focal length a photographing lens 805 capable of photographing at a plurality of focal lengths should assume during the next photographing, exposure value calculating means 803 for calculating an exposure value on the basis of at least a full open aperture stop value corresponding to the input focal length and the brightness information, and drive means 804 for driving the photographing lens 805 until it assumes the output focal length after the calculation of the exposure value by said exposure value calculating means 803.

The focal length output means 802 outputs a focal length the photographing lens 805 should assume during the next photographing. The exposure value calculating means 803 calculates an exposure value on the basis of a full open aperture stop value corresponding to said output focal length and the brightness information output by the photometry means 801. The drive means 804 drives the photographing lens 805 until it assumes the focal length output by the focal length output means 802 after the calculation of the exposure value by the exposure value calculating means 803. Thereby, even when flash light emission becomes necessary, for example, with a change in the focal length, it becomes possible to accomplish flash photography within a very short time after the photographing.

The applicant has previously proposed an apparatus. An apparatus previously proposed is such that for example, during the above-described given magnification photography, an exposure value is calculated on the basis of a full open aperture stop value corresponding to the set focal length of the photographing lens and the object brightness and when this exposure value is a value requiring flash light emission, charging for light emission is started and thereafter the photographing lens is driven to said focal length. According to this, charging and lens drive are effected side by side and therefore, if charging has been completed when the photographing lens has reached a predetermined focal length, photographing can be immediately effected without waiting for the charging time.

Again in the apparatus of this type, however, if charging has not been completed when the photographing lens has reached the predetermined focal length, photographing is effected after the completion of charging and therefore, which may detract from the quickness of photographing in such a case. Also, for example, in a camera which is capable of accomplishing the above-described given magnification photography and which is not provided with an electronic flash device, if adequate exposure is not obtained at a set focal length, it is necessary to give up photographing or effect photographing with full knowledge that an undesired photograph will result.

Also, in a certain kind of camera a focal length of a photographing lens for photographing an object at a preset photograph magnification is calculated on the basis of the object distance detected by a distance measuring device or the like with the half depressing operation of a release button, and the photographing lens is driven to the calculated focal length, whereafter photographing is effected with the full depressing operation of the release button. Thereby, if a predetermined photograph magnification is set, a photograph of the so-called waist shot size in which, for example, the bust of an object (a person) is contained in the picture plane will be obtained irrespective of the object distance, simply by the operation of the release button.

Now, the guide number of an electronic flash device is determined by the product of the full open F-value of a photographing lens and the object distance. Accordingly, in the case of an electronic flash device of a predetermined guide number, an object distance for which flash photography can be effected (the flash reach distance) can be found from this guide number and the full open F-value of the photographing lens.

When, for example, the above-described given magnification photography is to be effected by the use of such an electronic flash device of a predetermined guide number, if the object distance is great and the photographing lens is driven to the telephoto side, the full open F-value of the photographing lens becomes great and therefore, the above-mentioned flash reach distance becomes short. If this flash reach distance becomes smaller than the object distance, the emitted light of the electronic flash device will not sufficiently reach the object and an under-exposed photograph will be taken.

It is still another object of the present invention to secure the quickness of photographing when for example, the above-described given magnification photography is effected and to enable photographing to be effected at adequate exposure.

It is yet another object of the present invention to provide a zooming controller for a camera which prevents under-exposed photographs from being taken.

Describing the present invention with reference to FIGS. 15A and 15B of the accompanying drawings, the present invention is applied to a focal length controller for use in a camera capable of photographing at a plurality of focal lengths, provided with focal length setting means 151 for calculating and setting a focal length which should be assumed during photographing on the basis of a predetermined condition, and drive means 152 for driving a photographing lens LE so as to assume the set focal length.

The invention shown in FIG. 15A, is provided with photometry means 153 outputting brightness information regarding the brightness of an object, and judgment means 154 for judging whether the light emission of an electronic flash device is necessary on the basis of at least the brightness information, and solves the above-noted technical task by constructing the focal length setting means 151 as follows: the focal length setting means newly calculates and sets a focal length more toward the wide angle end side than said set focal length so that the light emission of the electronic flash device becomes unnecessary when the judgment means 154 judges that the light emission of the electronic flash device is necessary.

Also, the invention shown in FIG. 15B, is provided with photometry means 153 outputting brightness information regarding the brightness of an object, exposure value calculating means 155 for calculating an exposure value on the basis of at least the brightness information, and judgment means 156 for judging whether the calculated exposure value is an adequate value at which adequate exposure is obtained or an inadequate value at which adequate exposure is not obtained when photographing is effected at this exposure value, and solves the above-noted technical task by constructing the focal length setting means 151 as follows: the focal length setting means newly calculates and sets a focal length more toward the wide angle end side than said set focal length so that an adequate value may be obtained when the judgment means 156 judges that said exposure value is an inadequate value.

(5) The apparatus according to the invention of FIG. 15A:

The focal length setting means 151 newly calculates and sets a focal length more toward the wide angle end side than the focal length set at first so that the light emission of the electronic flash device may become unnecessary when it is judged by the judgment means 154 that the light emission of the electronic flash device is necessary. Thereby, photographing can be effected at adequate exposure even if the electronic flash device is not used and therefore, the quickness of photographing can be secured.

(6) The apparatus according to the invention of FIG. 15B:

The focal length setting means 151 newly calculates and sets a focal length more toward the wide angle end side than the focal length set at first so that an adequate value may be obtained when the judgment means 156 judges that the exposure value calculated by the exposure value calculating means 155 is an inadequate value. Thereby, photographing can be effected at adequate exposure without photographing being given up even with a camera which is not provided with an electronic flash device.

Further describing the present invention with reference to FIG. 19A of the accompanying drawings a zooming controller is provided with a zoom lens 191, object distance detecting means 192 for detecting an object distance corresponding to the distance to an object, an electronic flash device 193 of a predetermined guide number, full open F-value output means 194 outputting a full open F-value varying in conformity with each focal length of the zoom lens 191, calculation means 195 for calculating a flash reach distance on the basis of at least the full open F-value at any focal length of the zoom lens 191 and the guide number of the electronic flash device 193 during flash photography using the electronic flash device 193, and lens drive control means 196 for setting a focal length having such a full open F-value that the flash reach distance is greater than the object distance when the detected object distance is greater than the calculated flash reach distance, and driving the zoom lens 191 so as to assume said focal length, and thereby solve the above-noted technical task.

Describing the present invention with reference to FIG. 19B of the accompanying drawings, the invention of FIG. 19B is applied to a zooming controller for a camera provided with said zoom lens 191, said object distance detecting means 192, and lens drive control means 198 for setting such a first focal length that the object is photographed at a preset photograph magnification irrespective of the object distance detected by the object distance detecting means 192, on the basis of said detected object distance, and driving the zoom lens 191 so as to assume said first focal length.

The invention of FIG. 19B is further provided with an electronic flash device 193 of a predetermined guide number, full open F-value output means 194 outputting a full open F-value varying in conformity with each focal length of the zoom lens 191, and calculation means 197 for calculating a flash reach distance on the basis of at least the full open F-value at the first focal length of the zoom lens 191 and the guide number of the electronic flash device 193 during flash photography using the electronic flash device 193, and solves the above-noted technical task by constructing the lens drive control means 198 as follows: the lens drive control means 5 sets a second focal length having such a full open F-value that the calculated flash reach distance is greater than the object distance detected during the setting of the first focal length when said detected object distance is greater than said calculated flash reach distance, and drives the zoom lens 191 so as to assume said second focal length.

(7) The apparatus according to the invention of FIG. 19A:

The calculation means 195 calculates a flash reach distance on the basis of at least the full open F-value at any focal length of the zoom lens 191 and the guide number of the electronic flash device 193 during flash photography using the electronic flash device 193. The lens drive control means 196 sets a focal length having such a full open F-value that the flash reach distance is greater than the object distance when the object distance detected by the object distance detecting means 192 is greater than the flash reach distance calculated by the calculation means 195, and drives the Zoom lens 191 so as to assume said focal length. Thereby, under-exposed photographs are prevented from being taken.

(8) The apparatus according to the invention of FIG. 19B:

The calculation means 197 calculates a flash reach distance on the basis of at least a full open F-value at a first focal length of the zoom lens 191 and the guide number of the electronic flash device 193. The lens drive control means 198 sets a second focal length having such a full open F-value that the flash reach distance calculated by said calculation means 197 is greater than the object distance detected during the setting of the first focal length when said detected object distance is greater than said calculated flash reach distance, and drives the zoom lens 191 so as to assume said second focal length. Thereby, even during given magnification photography, under-exposed photographs are prevented from being taken.

BRIEF DESCRIPTION OF THE DRAWINGS

FIGS. 2 to 5A show an embodiment of the present invention, in greater detail FIG. 2 being a block diagram of a zooming controller for a camera according to the present invention, and FIGS. 3–5A being flow charts showing the processing procedure.

FIGS. 6 and 7 are flow charts showing modifications of the processing procedure.

FIGS. 11, 12, 13, 13A, 13B, 13C, 13D, 14, 14A, 14B, 14C, and 14D are flow charts showing modifications of the processing.

DESCRIPTION OF THE PREFERRED EMBODIMENTS

An embodiment of the present invention will hereinafter be described with reference to FIGS. 2 to 5.

Figure 2:
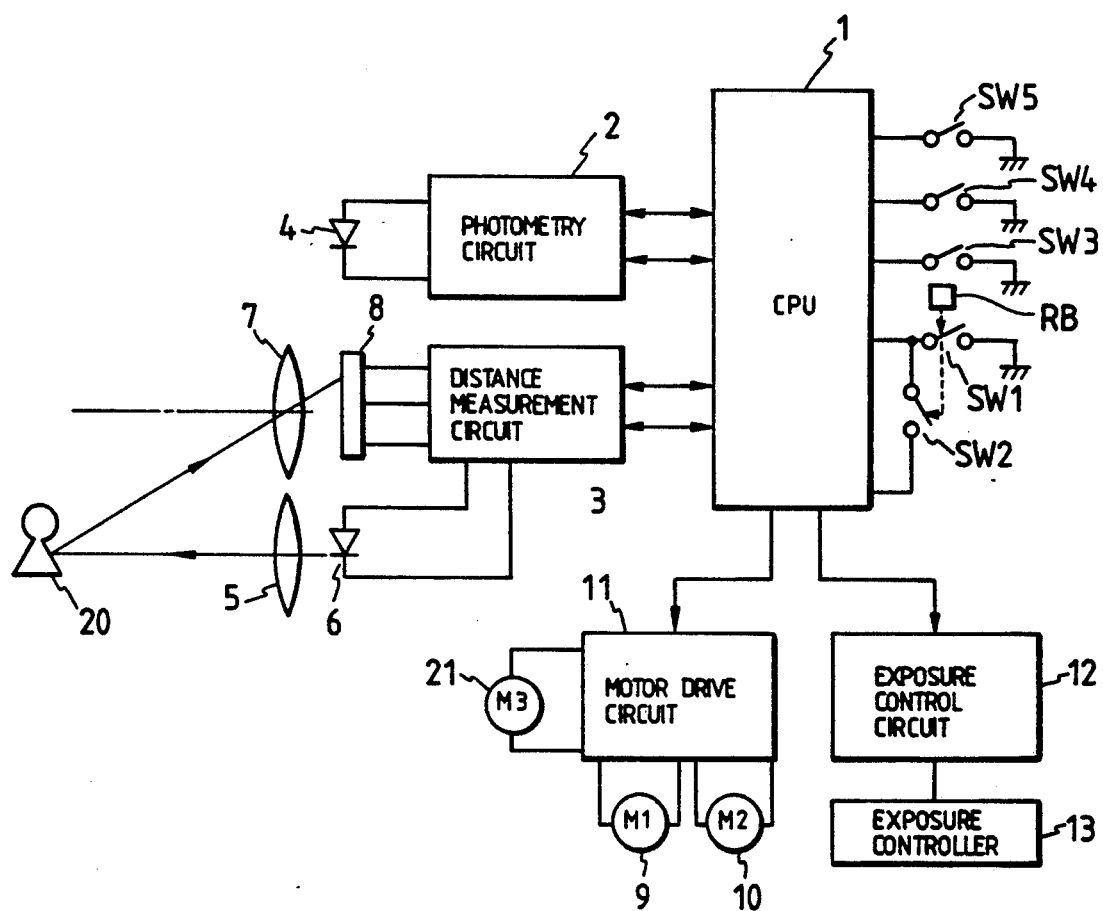

Referring to FIG. 2, a photometry circuit 2 and a distance measurement circuit 3 are connected to CPU 1. A light receiving element 4 for receiving light from an object is connected to the photometry circuit 2, and brightness information (object brightness) regarding the brightness of the object is calculated on the basis of the detection signal of the light receiving element 4 and is input to the CPU 1. Connected to the distance measurement circuit 3 are a projector 6 for projecting a light toward the object through projection lens 5 and a light receiving element 8 for receiving the reflected light from the object through a light receiving lens 7, and distance information (object distance) conforming to the distance to the object is calculated on the basis of the detection signal of the light receiving element 8 and is input to the CPU 1.

Also connected to the CPU 1 are a motor drive circuit 11 for a focusing motor 9, a zooming motor 21 and a film winding and rewinding motor 10, an exposure control circuit 12 for driving and controlling an exposure controller 13, and switches SW1 and SW2 adapted to be closed in response to the depression of a release button, RB. The switch SW1 is adapted to be closed by the half depression of the release button, RB and the switch SW2 is adapted to be closed by the full depression of the release button RB.

The CPU 1 operates the photometry circuit 2 and the distance measurement circuit 3 by the closing of the switch SW1, and calculates the lens drive amount for directing a photographing lens, not shown, to the in-focus position, on the basis of the object distance output from the distance measurement circuit 3 and also calculates the exposure value on the basis of the object brightness from the photometry circuit 2. When the switch 2 is thereafter closed, the motor 9 is driven through the motor drive circuit 11, and the photographing lens is moved by the calculated amount of lens movement to thereby accomplish focusing. Thereafter, the exposure controller 13 is driven through the exposure control circuit 12 to thereby effect photographing and the film is wound up by one frame by the motor 10.

Further, switches SW3–SW5 are connected to the CPU 1.

The switch SW3 is a switch adapted to be closed in response to the operation of a zoom-up button, not shown, and the closed state of the switch SW3 is maintained as long as the zoom-up button is operated. The CPU 1 outputs a second zoom signal as long as the switch SW3 is closed, and drives a zoom lens, not shown, by the zooming motor 21 through the motor drive circuit 11 to thereby vary the focal length of the photographing lens to the telephoto side. That is, so-called zoom-up is accomplished.

The switch SW4 is a switch operatively associated with a zoom-down button, not shown, and the closed state of the switch SW4 is maintained as long as the zoom-down button is operated. The CPU 1 outputs the second zoom signal as long as the switch SW4 is closed, and drives the zoom lens by the motor 21 through the motor drive circuit 11 to thereby vary the focal length of the photographing lens to the wide angle side. That is, so-called zoom-down is accomplished.

The switch SW5 is a momentary type switch adapted to be closed in response to the operation of a given magnification photographing button, not shown, and the CPU 1 sets the given magnification photograph mode by the closing of this switch SW5. During the setting of this given magnification photograph mode, so-called given magnification photographing in which the main object is photographed always at a predetermined size irrespective of the distance to the object is effected.

That is, a plurality of focal lengths of the photographing lens conforming to the object distance are stored as magnification tables in the CPU 1, and in these tables, the ratio of the object distance to the focal length, i.e., the photograph magnification, is fixed. The CPU 1 selects the sets one of an magnification tables by the frequency of the operation of the given magnification photographing button, i.e., the frequency of the closing of the switch SW5.

In the camera of the present embodiment, a magnification table A for photographing the portion of a person to be photographed above his or her neck at a given magnification, a magnification table B for photographing the bust of the person to be photographed at the given magnification and a magnification table C for photographing the whole body of the person to be photographed at the given magnification are stored. When the switch SW5 is closed once with the given magnification photograph mode remaining unset, the above-mentioned given magnification photograph mode is set and also the magnification table A is selected and set, and when the switch SW5 is closed once more, the magnification table B is selected and set, and when the switch SW5 is closed once again, the magnification table C is selected and set. When the switch SW1 is closed by half depression after the setting of one of the magnification tables, the CPU 1 automatically sets a focal length conforming to the object distance obtained by the distance measurement circuit 3 from the selected magnification table, and outputs a first zoom signal to the motor drive circuit 11 to drive the photographing lens to this focal length. If the switch SW5 is closed when the magnification table C has been selected, the given magnification photograph mode is released.

Also, when after the setting of the given magnification photograph mode, the zoom-up button or the zoom-down button is operated to close the switch SW3 or SW4, the CPU 1 releases the given magnification photograph mode, and outputs the second zoom signal to the motor drive circuit 11 to cause the motor 21 to effect zoom-up or zoom-down. Even if the switch SW1 is closed in this state, automatic setting of the focal length and driving do not take place because the given magnification photograph mode is released. When the full depression switch SW2 is thereafter closed and the above-described photographing operation is performed, the CPU 1 resets the given magnification photograph mode and also re-sets the previously selected and set magnification table.

In the construction of the above-described embodiment, the switch SW1 constitutes a release operation member 101, the CPU 1 constitutes first zoom signal output means 102 and control means 106, the switches SW3 and SW4 and the CPU 1 together constitute second zoom signal output means 103, the switch 105, and the motor drive circuit 11 and the motor 21 together constitute drive means 104.

The procedure of the control by the CPU 1 will now be described with reference to the flow charts of FIGS. 3–5A.

Figure 3:
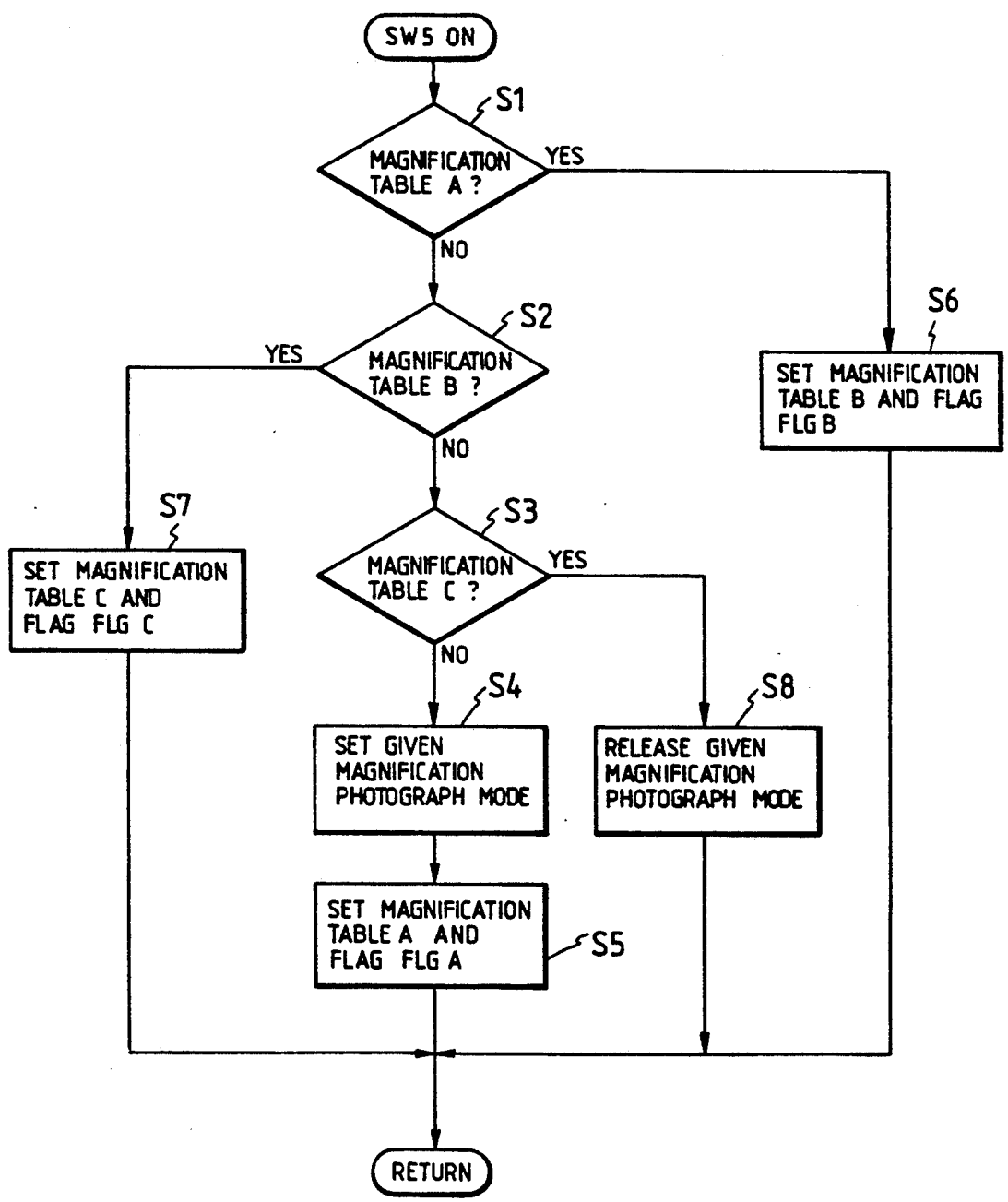

FIG. 3 shows the procedure of the magnification table selection. When the switch SW5 is closed, this program is interruptingly started and first, at step S1, whether the magnification table A is currently set is judged. If the judgment is affirmative, at step S6, the magnification table B is set and flag FLGB is set, and if the judgment is negative, at step S2, whether the magnification table B is selected is judged. If step S2 is affirmed, at step S7, the magnification table C is set and flag FLGC is set, and if step S2 is negated, at step S3, whether the magnification table C is set is judged. If step S3 is affirmed, at step S8, the given magnification photograph mode and flag FLGC are released, and if step S3 is negated, at step S4, the given magnification photograph mode is set, and then at step S5, the magnification table A is selected and flag FLGA is set, whereafter return is made to the usual processing. When in the above-described processing, one of flags FLGA, FLGB and FLGC is set, the other two flags are released.

Figure 4:
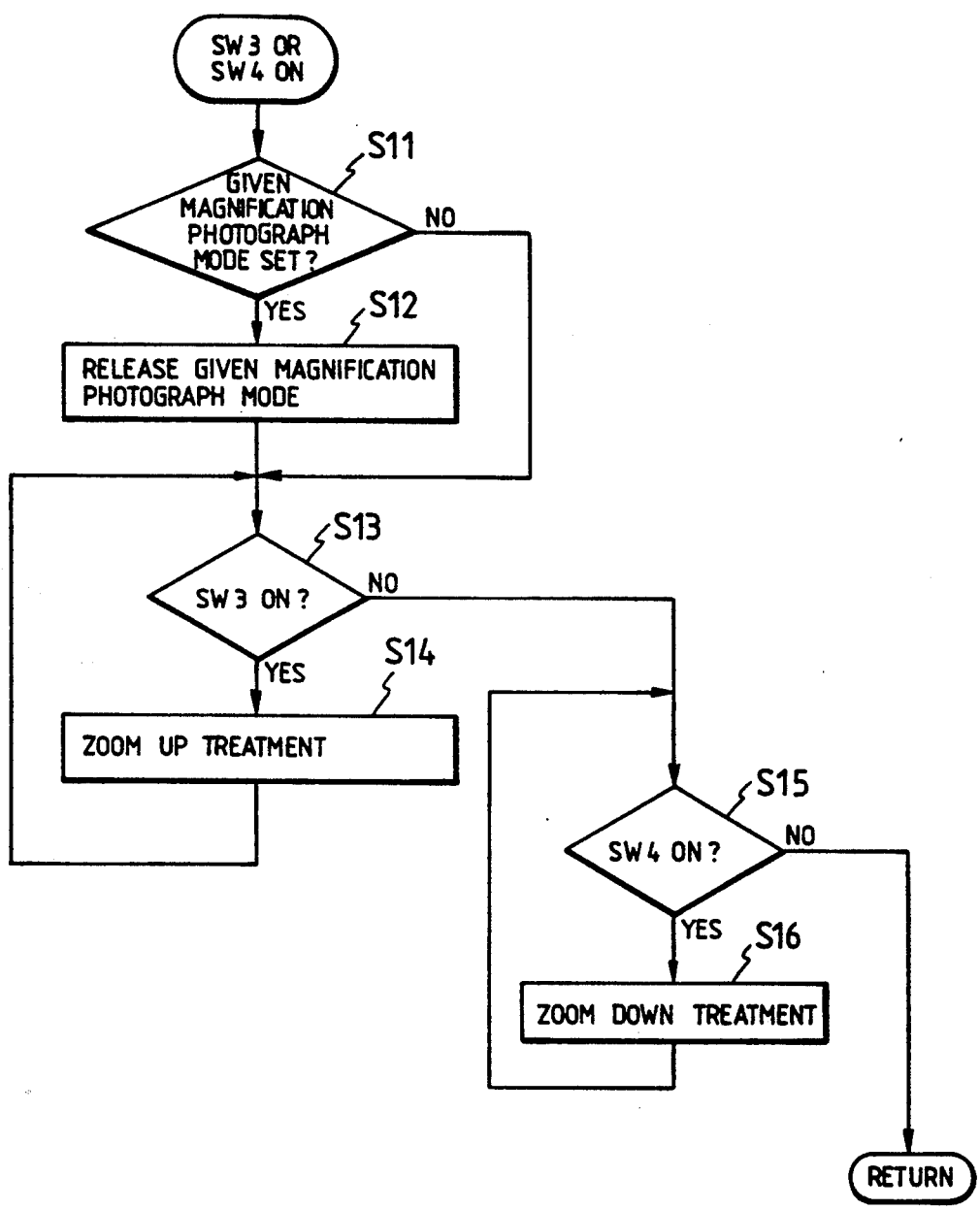

When the switch SW3 or SW4 is closed thereafter, the program of FIG. 4 is interruptingly started and first, at step S11, whether the given magnification photograph mode is set is judged. If the judgment is negative, advance is made to step S13, and if the judgment is affirmative, the given magnification photograph mode is released at step S12, and then advance is made to step S13. However, the release of the above-mentioned flags FLGA-C is not effected here. At step S13, whether the zoom-up switch SW3 is closed is judged. If the judgment is affirmative, at step S14, the zoom-up process is effected by the motor 21 through the motor drive circuit 11, and return is made to step S13. If step S13 is negated, advance is made to step S15, where whether the zoom-down switch SW4 is closed is judged. If step S15 is affirmed, at step S16, the zoom-down process is effected by the motor 21 through the motor drive circuit 11, and if step S15 is negated, return is made to the usual processing.

Figure 5A:
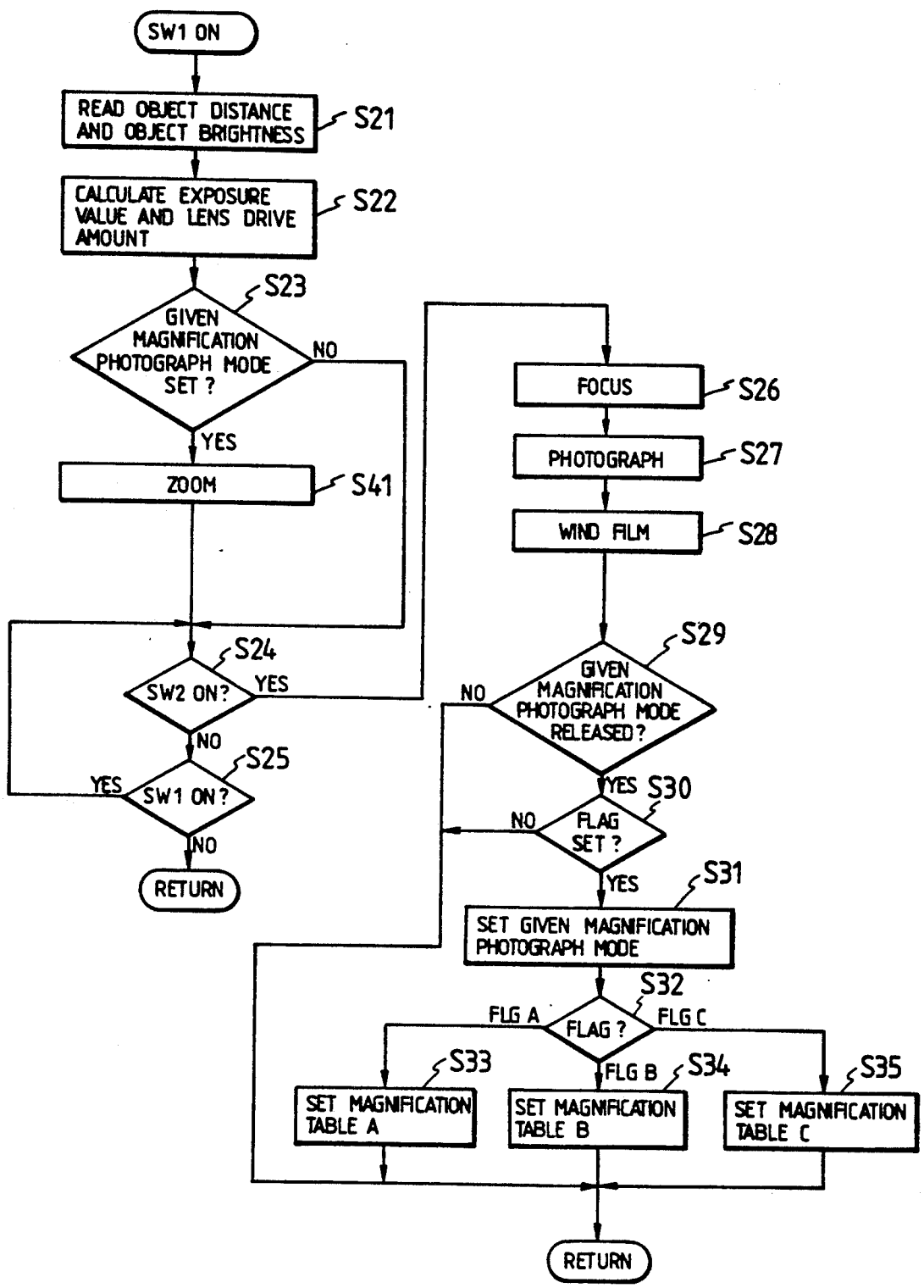

FIG. 5A shows the procedure of the processing when the switch SW1 is closed by the half depression of the release button.

When the half depression switch SW1 is closed, this program is interruptingly started and first, at step S21, the object distance obtained by the distance measurement circuit 3 and the object brightness obtained by the photometry circuit 2 are read. Then, at step S22, the lens drive amount for directing the photographing lens to the in-focus position is calculated on the basis of the object distance and the exposure value is calculated on the basis of the object brightness, and advance is made to step S23.

At step S23, whether the given magnification photograph mode is set is judged, and if the judgment is negative, advance is made to step S24. If the judgment is affirmative, at step S41, the set magnification table is referred to and a focal length conforming to the object distance read at step S21 is read, and a first zoom signal conforming to that focal length is output and the photographing lens is directed to the selected focal length by the motor 21 through the motor drive circuit 11.

Subsequently, at step S24, whether the full depression switch SW2 is closed is judged, and if the judgment is negative, at step S25, whether the switch SW1 is closed is judged. If step S25 is negated, return is made to the usual processing, and if step S25 is affirmed, return is made to step S24.

Here, when the switch SW3 or SW4 is closed after step S25 is negated and return is made to the usual processing, the above-described program of FIG. 4 is interruptingly started, and the given magnification photograph mode is released and the zoom-up or zoom-down process is effected.

If step S24 is affirmed, advance is made to step S26, where a focusing command signal conforming to the lens drive amount calculated at step S22 is output, and the photographing lens is driven to the in-focus position by the motor 9 through the motor drive circuit 11. Subsequently, at step S27, the exposure controller 13 for the shutter and the stop is driven through the exposure control circuit 12 to effect photographing, whereafter at step S28, the film is wound up by one frame by the motor 10 through the motor drive circuit 11, and advance is made to step S29.

At step S29, whether the given magnification photograph mode is released is judged. If the judgment is negative, return is made to the usual processing, and if the judgment is affirmative, advance is made to step S30. At step S30, whether one of flags FLGA, FLGB and FLGC is set is judged. If step S30 is negated, return is made to the usual processing, and if step S30 is affirmed, at step S31, the given magnification photograph mode is again set and advance is made to step S32. At step S32, whether one of flags FLGA; FLGB and FLGC is set is judged, and if it is judged that flag FLGA is set, the magnification table A is set at step S33, and if it is judged that flag FLGB is set, the magnification table B is set at step S34, and if it is judged that flag FLGC is set, the magnification table C is set at step S35, and return is made to the usual processing.

According to the above-described procedure, if the half depression of the release button is effected when the given magnification photograph mode is set, a predetermined focal length is automatically set, and the photographing lens is driven to this focal length, and if the zoom-up button is operated after the half depression is released thereafter, the given magnification photograph mode is released and the zoom-up or zoom-down process is effected. Even if the half depression is again effected thereafter, automatic setting of the focal length and driving of the photographing lens are not effected. Accordingly, if the composition by the focal length set by the camera side is not satisfactory when the half depression is effected after the given magnification photographing button is operated, the half depression may be released and then the zoom-up-down button may be operated to finely adjust the focal length, and thereafter the release operation may be effected, whereby photographing can be effected at a desired focal length. Also, the given magnification photograph mode released by the operation of the zoom-up-down button is reset in response to the completion of photographing and the previously set magnification table is likewise reset and therefore, it is not necessary to manually re-set the given magnification photograph mode released with the manual operation of the zoom-up or zoom-down switch each time photographing is terminated and thus, operability is improved.

In FIG. 5A, there is shown an example in which the photographing lens is automatically driven to the set focal length by the half depressing operation, whereafter the half depression is released and then manual zooming is effected, whereby the given magnification photograph mode is released and thereafter, the given magnification photograph mode is again set when photographing is effected, but the steps S29-S35 of FIG. 5A may be deleted so that the resetting of the given magnification photograph mode may not be effected.

Figure 5B:
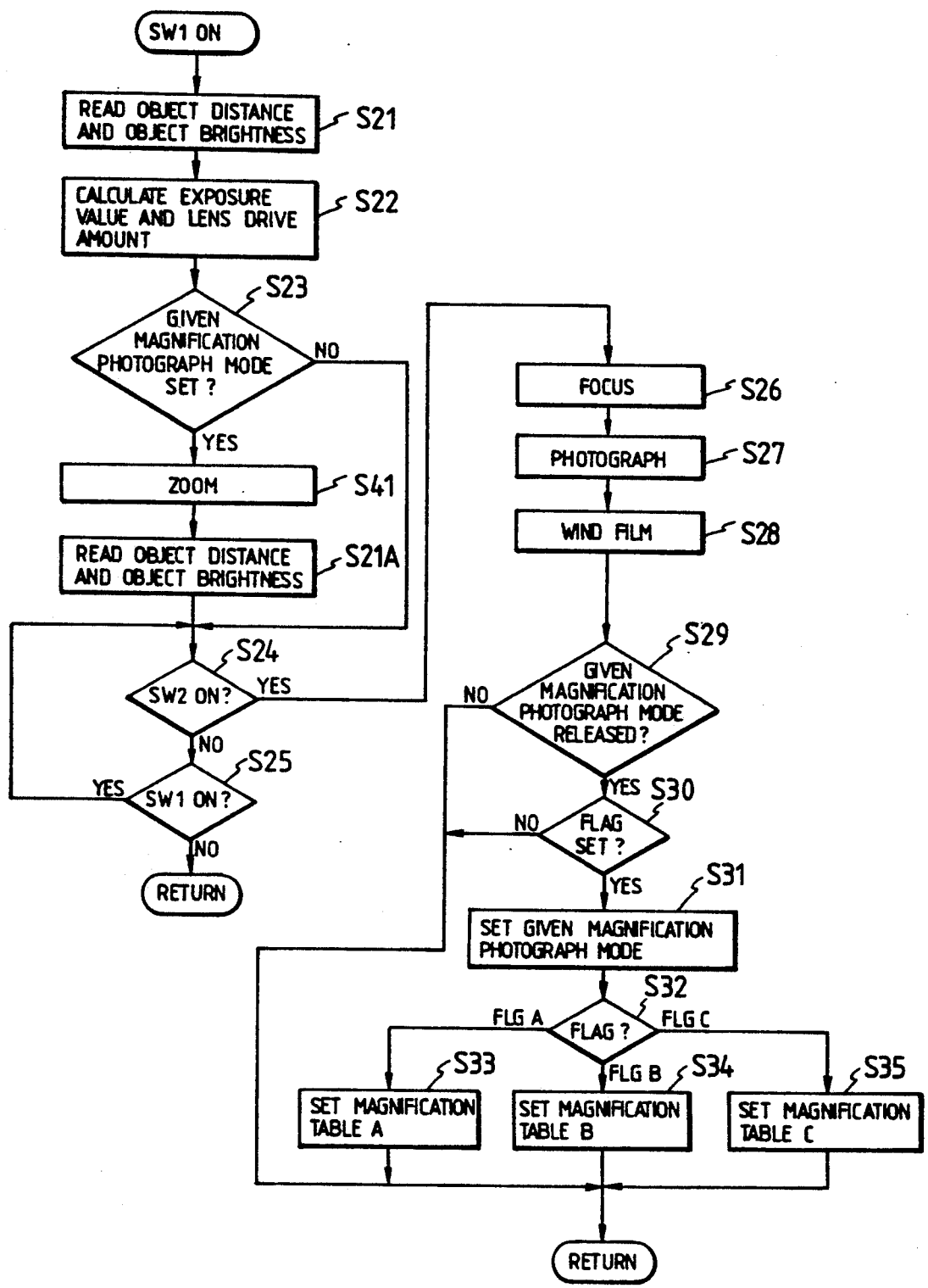
FIGS. 5B, 5C, 5D show variations of FIG. 5A.
Figure 5C:
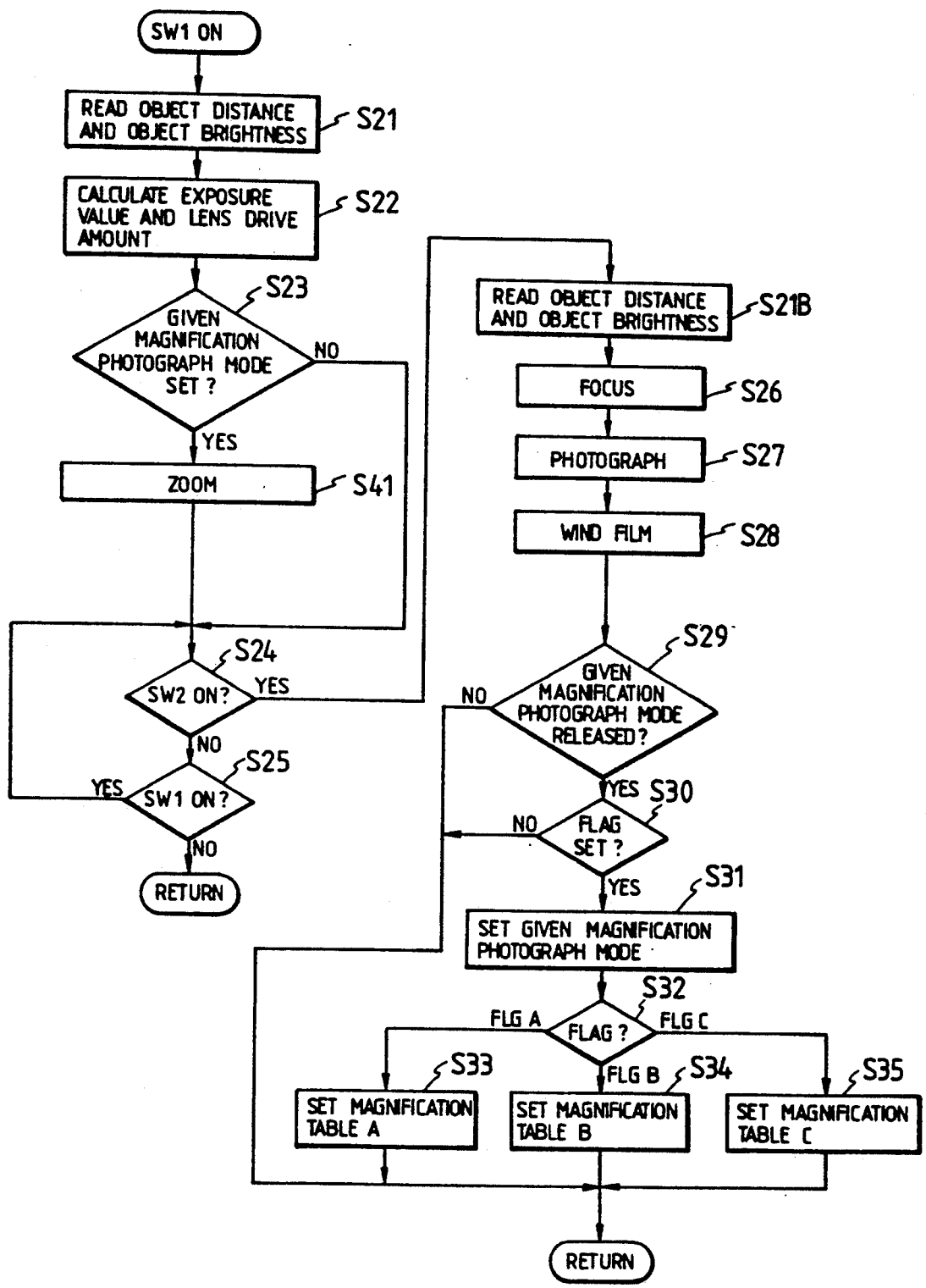
Figure 5D:
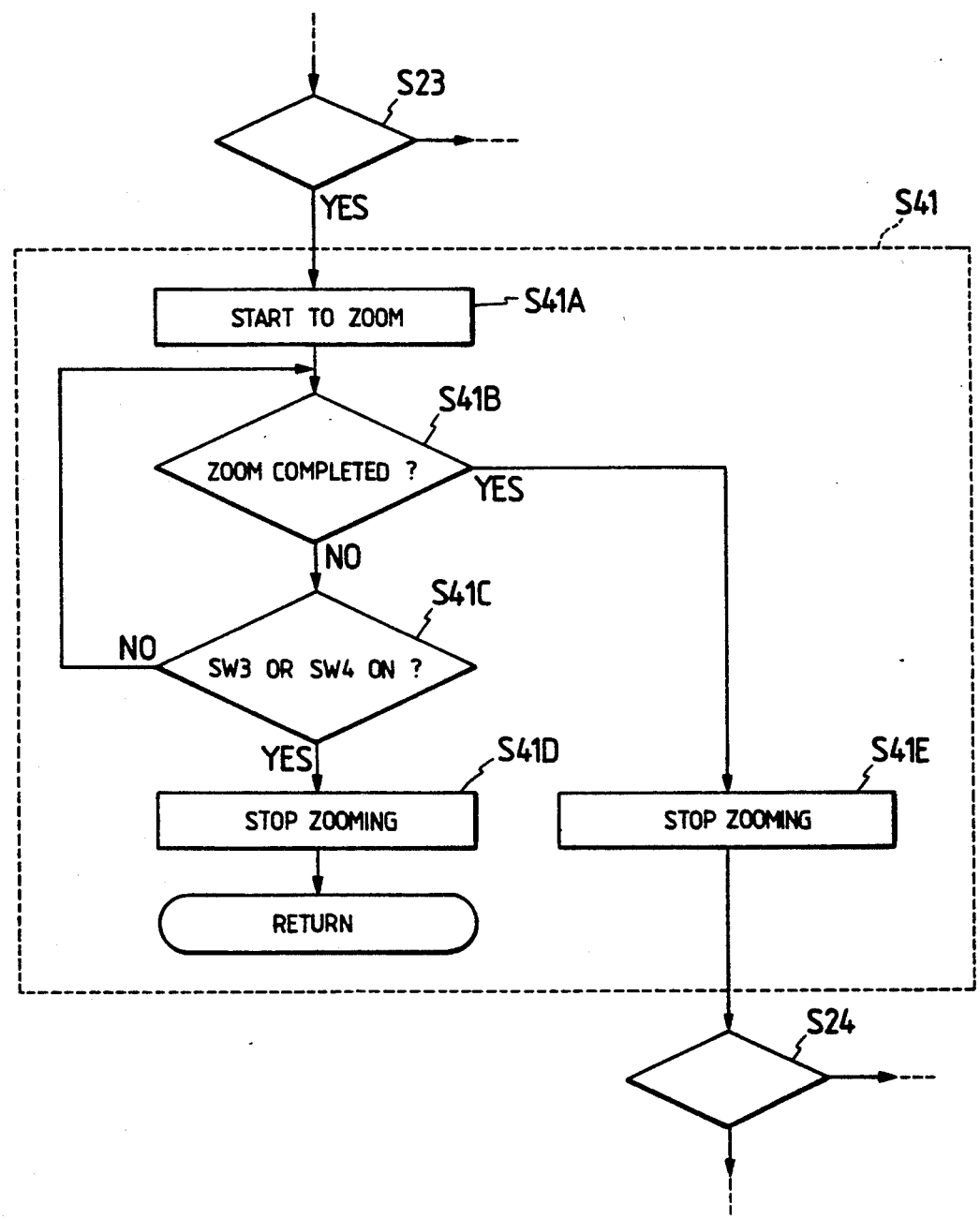
Figure 8:
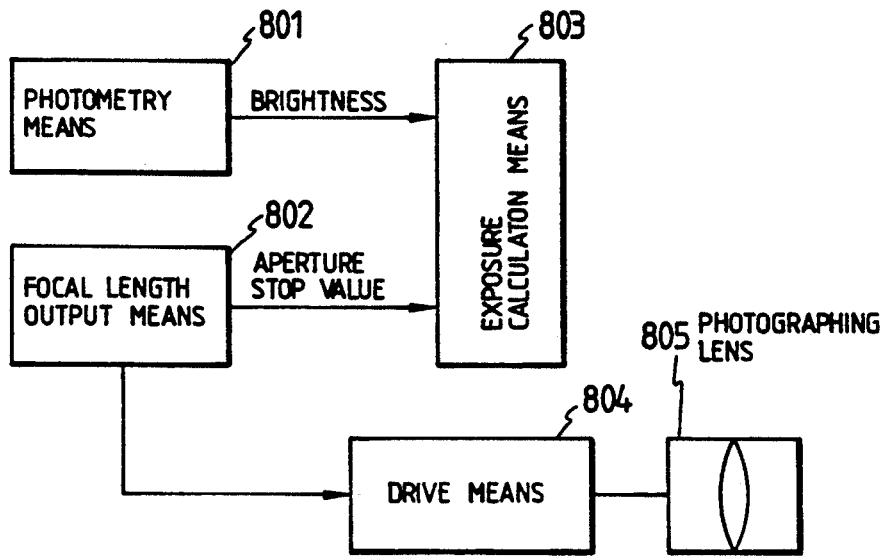
FIG. 8 is a block diagram for broadly illustrating another embodiment of the invention.

In the following there will be explained FIGS. 5B, 5C and 5D showing variations of FIG. 5A.

FIG. 5B contains a new step S21A between the steps S41 and S24 shown in FIG. 5A. Step S21A is the same function as the step S21. In FIG. 5B, after the zooming in the step S41, the step S21A activates the distance measurement circuit 3 and the photometry circuit 2 again, thereby obtaining information on the object distance and the object brightness. The focusing operation in the step S26 is conducted on the information on the object distance, and the exposure operation in the step S27 is conducted on the information on the object brightness.

Consequently, even if the object distance and the object brightness vary during the zooming in the step S41, the focusing and the exposure operation can follow such variations. The foregoing information is retained as long as the step S25 identifies the on-state of the half depression switch Sw1. If the step S25 identifies the off-state thereof, the process of FIG. 5B is terminated. If the half depression switch Sw1 is turned on again, the distance measurement and the photometry are conducted again in the step S21 in FIG. 5B, and the information on the object distance and the object brightness obtained in the step S21A are renewed.

FIG. 5C contains a step S21B inserted between the YES line of the step S24 and the step S26 in FIG. 5A. Step S21B is of the same function as that of the step S21. In the sequence shown in FIG. 5C, after the step S24 identifies the on-state of the full depression switch Sw2, the step S21B activates the distance measurement circuit 3 and the photometry circuit 2 again, thereby obtaining information on the object distance and the object brightness. The focusing in the step S26 is conducted on the information on the object distance, and the exposure operation in the step S27 is conducted on the information on the object brightness.

Consequently, even if the object distance and the object brightness vary during the zooming of the step S41, or during the repeated execution of the steps S24 and S25 due to the on-state of the half depression switch Sw1 and the off-state of the full depression switch Sw2, the focusing and the exposure operation can follow such variations.

FIG. 5D shows a variation of the step S41 in FIG. 5A.

If the discrimination of the step S23 in FIG. 5A turns out affirmative, indicating the setting of the given magnification photograph mode, a step S41A starts zooming. Thereafter the step 41B discriminates whether zooming has been completed, namely whether the photographing lens has reached the selected focal length. If the discrimination of the step 41B turns out negative, a step S41C discriminates whether either the zoom-up switch Sw3 or the zoom-down switch Sw4 has been turned on. If negative, the sequence returns to the step S41B. The steps S41B and S41C are repeated until affirmative discrimination is obtained in either step.

If the step S41C provides an affirmative result by the closing of the zoom-up switch Sw3 or the zoom-down switch Sw4, a step S41D terminates the zooming. Thereafter the routine of FIG. 5C is terminated, and the sequence returns to the routine in FIG. 4, starting from the step S11. Thus there are conducted the releasing of the given magnification photograph mode and the zooming in response to the manipulation of the switch Sw3 or Sw4.

If the step S41B provides an affirmative result by the arrival of the photographing lens at the selected focal length, a step S41E terminates the zooming. Thereafter the sequence starting from the step S24 in FIG. 5A is executed.

As explained above, this variation provides superior operability, since, if the zoom-up switch Sw3 or the zoom-down switch Sw4 is turned on during the zooming of the step S41, in response the releasing of the given magnification photograph mode and the zooming according to the manipulation of the switch Sw3 or Sw4 are executed.

In the foregoing, there is shown an example in which the given magnification photograph mode is released by the operation of the zoom-up button and the zoom-down button. An example in which the given magnification photograph mode is released immediately after zooming or after the release of the half depression will now be described with reference to FIGS. 6 and 7. In FIGS. 6 and 7, steps similar to those of FIG. 5 are given similar reference characters.

In FIG. 6, if at step S23, the setting of the given magnification photograph mode is judged, advance is made to step S41, where the set magnification table is referred to set a focal length corresponding to the object distance and the photographing lens is driven to this focal length and zooming is effected, whereafter at step S61, the given magnification photograph mode is released. Thus, again, as described above, if the half depression is released and the focal length is finely adjusted, the focal length will not be changed by the half depression thereafter and photographing can be accomplished at a composition intended by the photographer.

Further, in FIG. 7, when after the zooming at step S41, the closing of the full depression switch SW2 is negated at step S24 and the closing of the half depression switch SW1 is judged at step S25, the given magnification photograph mode is released at step S71 and return is made to the usual processing. According to this, there is obtained the effect that photographing can be accomplished at a composition intended by the photographer as described above, and unlike the embodiment of FIG. 6 but as in the embodiment of FIG. 5, the setting of the given magnification photograph mode is continued even after the photographing of step S26 and subsequent steps is effected without the half depression being released, and this is convenient when given magnification photographing is to be continuously effected. Also, in the embodiment of FIG. 5, the given magnification photograph mode is maintained even if the half depression switch SW1 is released after the termination of photographing, and it is necessary to operate the mode switch SW5 to release the given magnification photograph mode, whereas in the embodiment of FIG. 7, the given magnification photograph mode is released when the half depression switch SW1 is released and therefore, mode change can be done from the given magnification photograph mode to the usual photograph mode without the necessity of any special operation.

In the embodiment of FIGS. 6 and 7, the resetting of the given magnification photograph mode is not effected after photographing and therefore, it is not necessary to effect the setting of the flags at the steps S5–S7 of FIG. 3, and the given magnification photograph mode is not released by the closing of the switches SW3 and SW4 and therefore, the steps S11 and S12 of FIG. 4 are unnecessary.

Further, in the foregoing, a case where the setting of the given magnification is effected, whereas the present invention is not restricted thereto, but is also applicable to a camera in which, for example, a desired focal length is input in advance by a manual operation and the photographing lens is driven to the input focal length by the half depression of the release button.

Figure 1A:
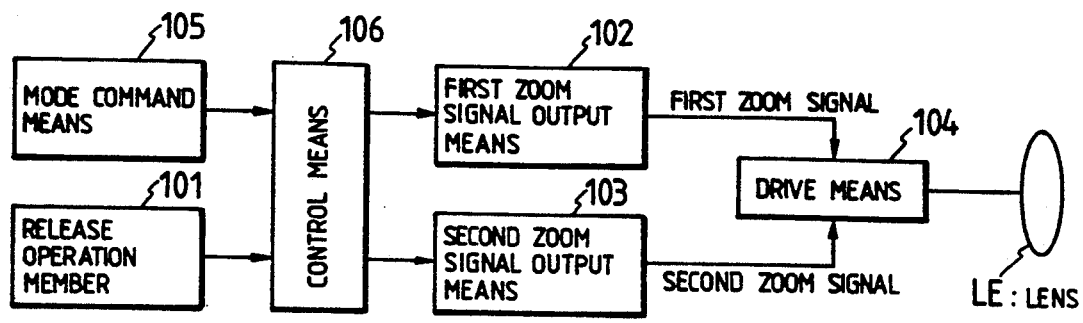
FIGS. 1A, 1B and 1C are block diagrams for broadly illustrating certain embodiments of the invention.

According to the invention of FIG. 1A, during the set auto focal length mode, the photographing lens is automatically driven to the focal length set on the camera by the half depressing operation, and when the manually operated zooming operation member is operated from after the half depressing operation is thereafter released until the next shutter release, said mode is released, and even if the half depressing operation is performed, zooming to the focal length set on the camera is not effected until the next shutter release is effected and therefore, when it is desired to change the focal length automatically set after the half depression, the half depression is once released and then the focal length of the photographing lens is adjusted by the operation of the manually operated zooming operation member, whereafter the full depressing operation is performed, whereby photographing can be accomplished at a desired focal length and thus, the operability of the camera is improved.

Also, according to an embodiment of the invention during the set auto focal length mode, the photographing lens is automatically driven to the focal length set on the camera by the half depressing operation and after the driving, this mode is released and thereafter, zooming to the focal length set on the camera is not effected even if the half depressing operation is performed and therefore, as described above, when it is desired to change the automatically set focal length, the half depression is once released and then the drive means is driven by manual operation to thereby adjust the focal length of the photographing lens, whereafter the full depressing operation is performed, whereby photographing can be accomplished at a desired focal length and thus, the operability of the camera is improved.

Figure 1B:
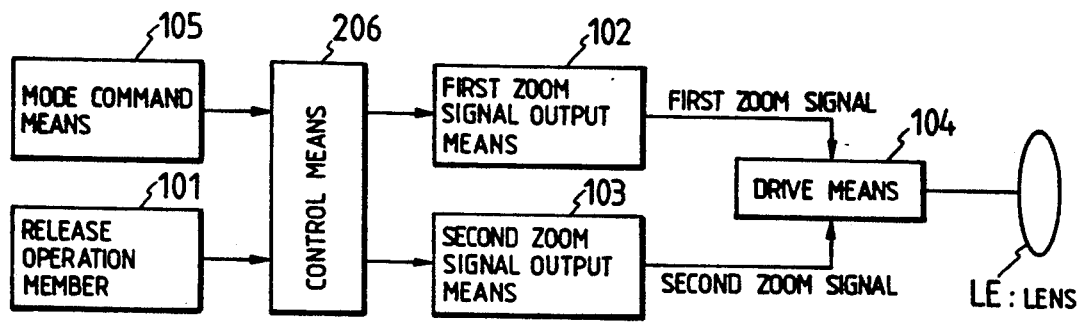
Figure 1C:
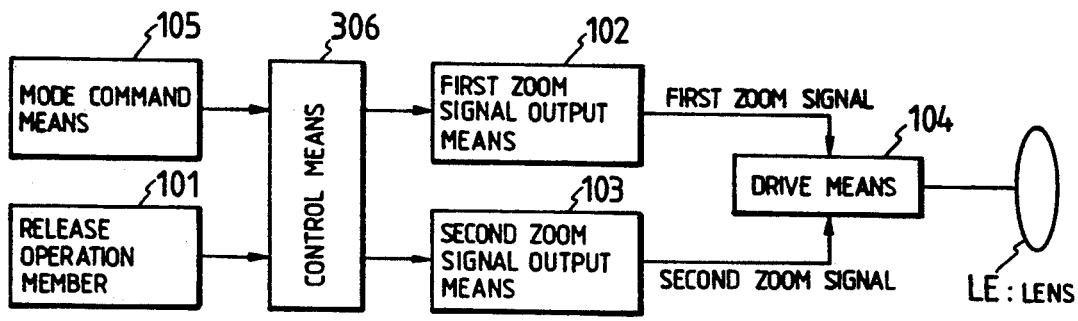

Further, according to the invention of FIG. 1B, during the set auto focal length mode, the photographing lens is automatically driven to the focal length set on the camera by the half depressing operation, and when the half depressing operation is released without shutter release being effected, this mode is released and thereafter, zooming to the focal length set on the camera is not effected even if the half depressing operation is performed, and therefore an effect similar to that described above is obtained and the auto focal length mode is continued as long as the half depression is not released, and this is convenient when for example, given magnification photographing is effected continuously.

Another embodiment of the present invention will now be described with reference to FIGS. 9–10B.

Figure 9:
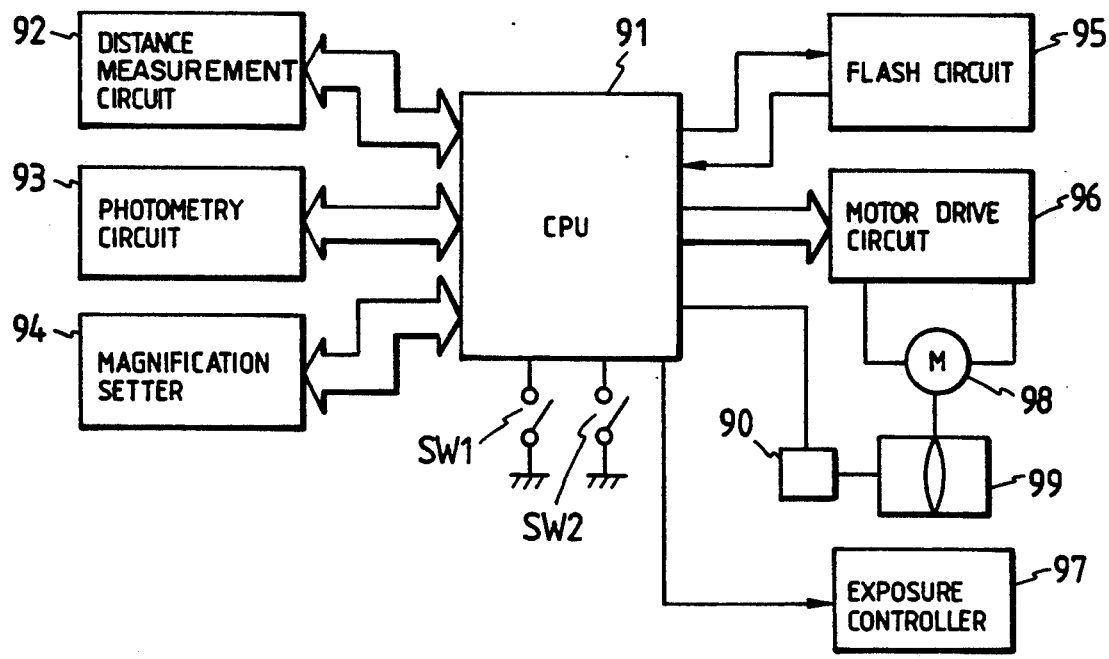
FIGS. 9, 10, 10A, and 10B show an embodiment of the present invention, FIG. 9 being a block diagram of an operation controller for a camera according to the present invention, and FIGS. 10–10B being a flow chart showing the processing procedure.

FIG. 9 is a block diagram of the operation controller of the camera according to the present invention. A distance measurement circuit 92, a photometry circuit 93 and a magnification setter 94 are connected to CPU 91. The distance measurement circuit 92 outputs measured distance data conforming to the distance to an object, and the photometry circuit 93 outputs brightness information regarding the brightness of the object. The magnification setter 94 outputs a photographing magnification preset and input, for example, by a button operation.

Also connected to the CPU 91 are the flash circuit 95 of an electronic flash device, a motor drive circuit 96, an exposure control circuit 97 and a zoom encoder 90. The flash circuit 95 charges a light emitting capacitor, not shown, and causes the light emitting tube thereof to emit light by the charge. The motor drive circuit 96 controls a motor 98 and drives a zoom lens 99 to a predetermined focal length, and the position of this zoom lens 99 is detected by the zoom encoder 90. The exposure control circuit 97 drives exposure control members such as a shutter and a stop, not shown.

Further connected to the CPU 91 are switches SW1 and SW2 adapted to be closed in response to the operation of a release button, not shown. The switch SW1 is closed by the half depression of the release button, and the switch SW2 is closed by the full depression of the release button. When these switches SW1 and SW2 are closed, the CPU 91 controls the above-mentioned circuits and effects a series of photographing processes as will be described later.

In the construction of the above-described embodiment, the photometry circuit 93 constitutes photometry means 801, the CPU 91 and the distance measurement circuit 92 together constitute focal length output means 802, the CPU 91 constitutes exposure calculation means 803, the motor drive circuit 96 and the motor 98 together constitute drive means 804, and the zoom lens 99 constitutes a photographing lens 805.

The procedure of the operation of the camera by the CPU 91 will now be described with reference to the flow chart of FIGS. 10–10B.

This program is started when the half depression switch SW1 is closed, and first, at step S101, measured distance data x representing the distance to the object obtained by the distance measurement circuit 92 is read. Subsequently, at step S102, a preset photograph magnification M is read from the magnification setter 94, and advance is made to step S103. At step S103, on the basis of the read measured distance data x and the photograph magnification M, the focal length f which the zoom lens 99 should assume during the next photographing is calculated by $f = M \times x$. Subsequently, at step S104, a full open aperture stop value F corresponding to the focal length f calculated at step S103 is found from among a plurality of full open aperture stop values preset and stored in conformity with the focal lengths of the zoom lens 99. At step S105, the brightness information b regarding the brightness of the object obtained by the photometry circuit 93 is read, and advance is made to step S106. At step S106, an exposure value is calculated on the basis of the brightness information b, the full open aperture stop value F found at step S104, and film speed information or the like. On the basis of this calculated exposure value, the aperture value, the shutter speed, etc. are determined and the presence or absence of the necessity of flash light emission is also determined.

At step S107, whether flash light emission is needed is judged, and if the judgment is affirmative, advance is made to step S108. At step S108, whether the charging of the light emitting capacitor is completed is judged, and if the judgment is negative, an alarm to the effect that the charging is not completed is output at step S109, and advance is made to step S110. At step S110, whether the half depression switch SW1 is closed is judged, and if this switch is opened, this processing procedure is advanced to END to thereby terminate the photographing operation, and if the switch SW1 is closed, at step S110, the driving of the zoom lens 99 is started by the motor 98 through the motor drive circuit 96 so that the zoom lens 99 assumes the focal length f calculated at step S103, and at step S112, the charging of the light emitting capacitor is started.

Advance is then made to step S113, where whether the zoom lens 99 has assumed the above-mentioned focal length f on the basis of the signal of the zoom encoder 90 is judged. If the judgment is affirmative, advance is made to step S114, where the driving of the zoom lens 99 is stopped, and at step S115, whether the charging of the light emitting capacitor has been completed is judged. If the judgment is affirmative, the charging is stopped at step S116, and the above-mentioned alarm is released at step S117, whereafter advance is made to step S118. If step S115 is negated, the program stays at step S115 until step S115 is affirmed, whereafter advance is made to step S118 via steps S116 and S117.

If step S113 is negated, advance is made to step S120, where whether the charging has been completed is judged. If the judgment is negative, return is made to step S113, and if the judgment is affirmative, advance is made to step S121, where the charging is stopped, and at step S122, the alarm is released. Subsequently, at step S123, whether the zoom lens 99 has assumed the aforementioned focal length f is judged. If the judgment is affirmative, the driving of the zoom lens 99 is stopped at step S124, whereafter advance is made to step S118. If the judgment is negative, the program stays at step S123 until the judgment becomes affirmative, whereafter advance is made from step S124 to step S118.

At step S118, whether the full depression switch SW2 is closed is judged. If the judgment is affirmative, advance is made to step S119, where the stop and the shutter are driven on the basis of the exposure value calculated at step S106 and photographing is effected. If step S118 is negated, at step S171, whether the half depression switch SW1 is OFF is judged, and if the judgment is affirmative, advance is made to END, and if the judgment is negative, return is made to step S118.

Also, if step S107 is negated or step S108 is affirmed, advance is made to step S125, where the driving of the zoom lens 99 is started. Then, at step S126, whether the zoom lens 99 has assumed the predetermined focal length f is judged, and if the judgment is affirmative, at step S127, the zoom lens 99 is stopped, and advance is made to step S118, where photographing is effected. If the judgment is negative, the program stays at step S126 until the judgment becomes affirmative.

According to the above-described procedure, exposure calculation is effected before the zoom lens 99 is driven to the predetermined focal length f, and the presence or absence of the necessity of flash light emission is judged on the basis of the result of the calculation, and if the flash light emission is judged as necessary and the charging is not completed, an alarm of uncompleted charging is produced. If the charging is completed while the zoom lens 99 is driven to the predetermined focal length f, photographing accompanied by flash light emission immediately becomes possible at a point of time whereat the driving of the zoom lens 99 is terminated. On the other hand, it is possible that the charging is not yet completed at the point of time whereat the driving of the zoom lens 99 is terminated, but the user is informed of the fact of the uncompleted charging in advance by an alarm and therefore, the user can be prepared for it and will no longer feel displeased by photographing being inhibited after the driving of the lens.

Figures 10, 10A:
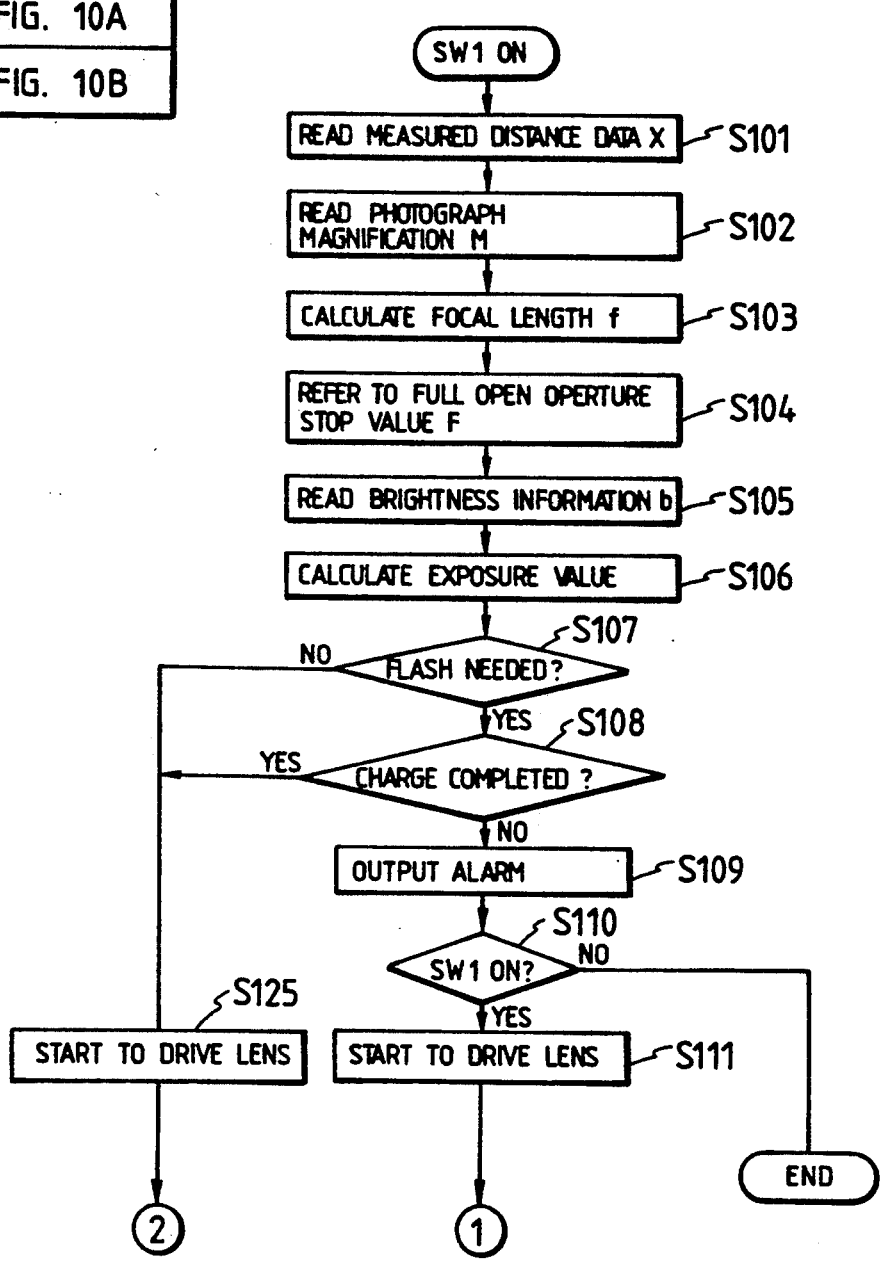
Figure 10B:
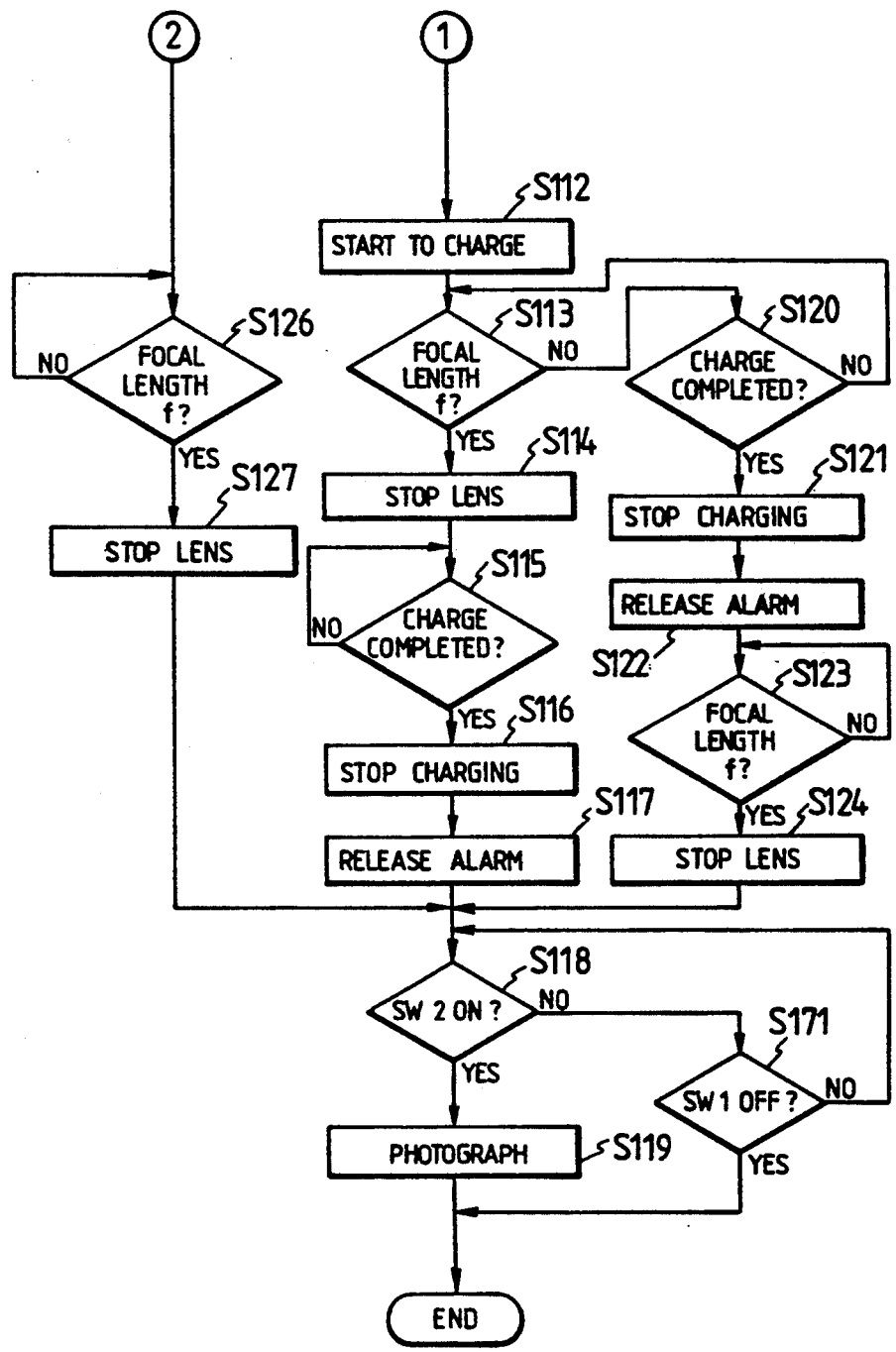

Modifications (1) In FIGS. 10-10B, the design is such that if the half depression switch SW1 is opened after the alarm of uncompleted charging, all the operation is terminated by step S110, but step S110 may be deleted and the design may be such that even if the half depression switch SW1 is opened before the driving of the zoom lens 99, the driving of the zoom lens 99 and the charging are effected.

Figure 11:
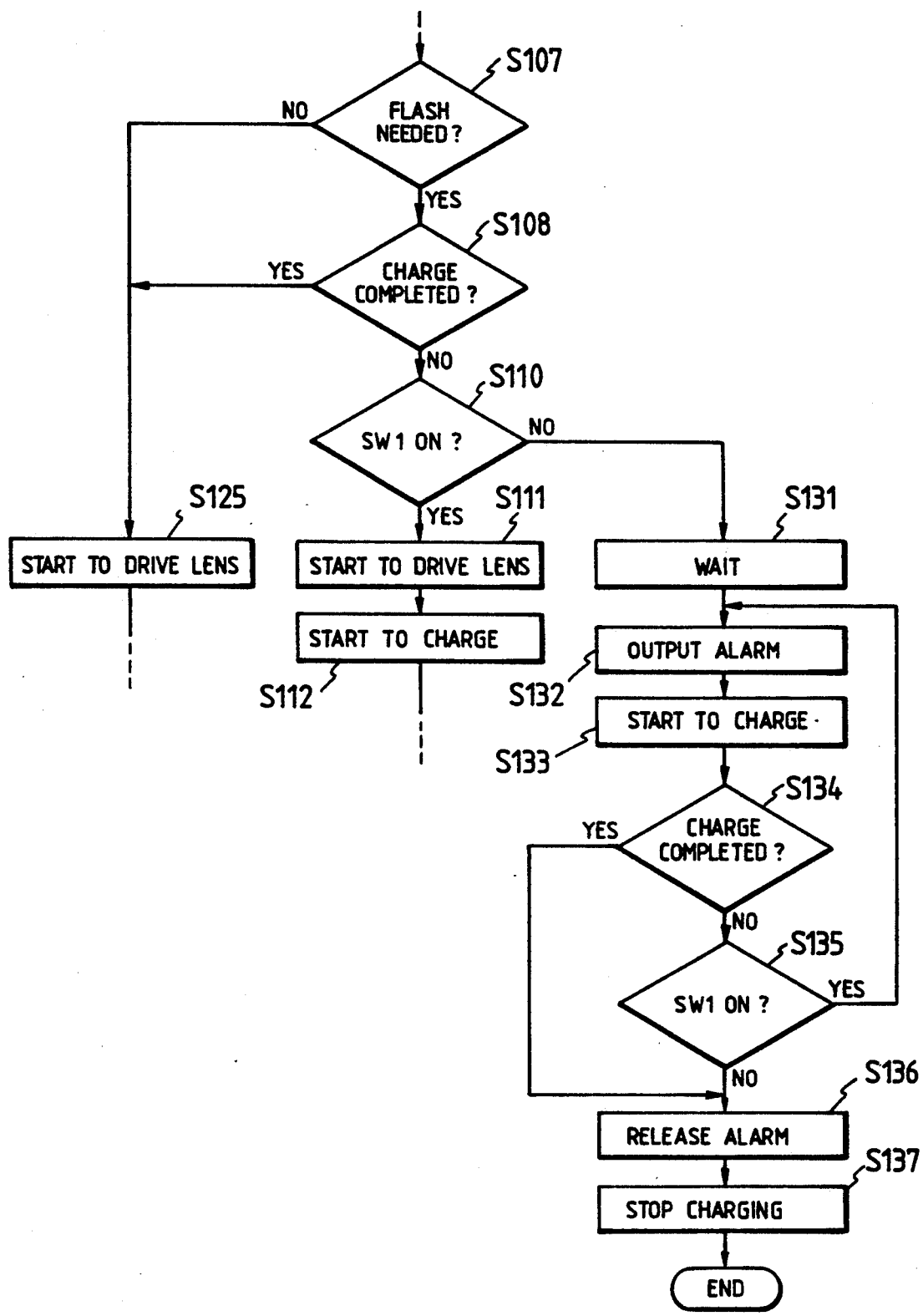
Figure 12:
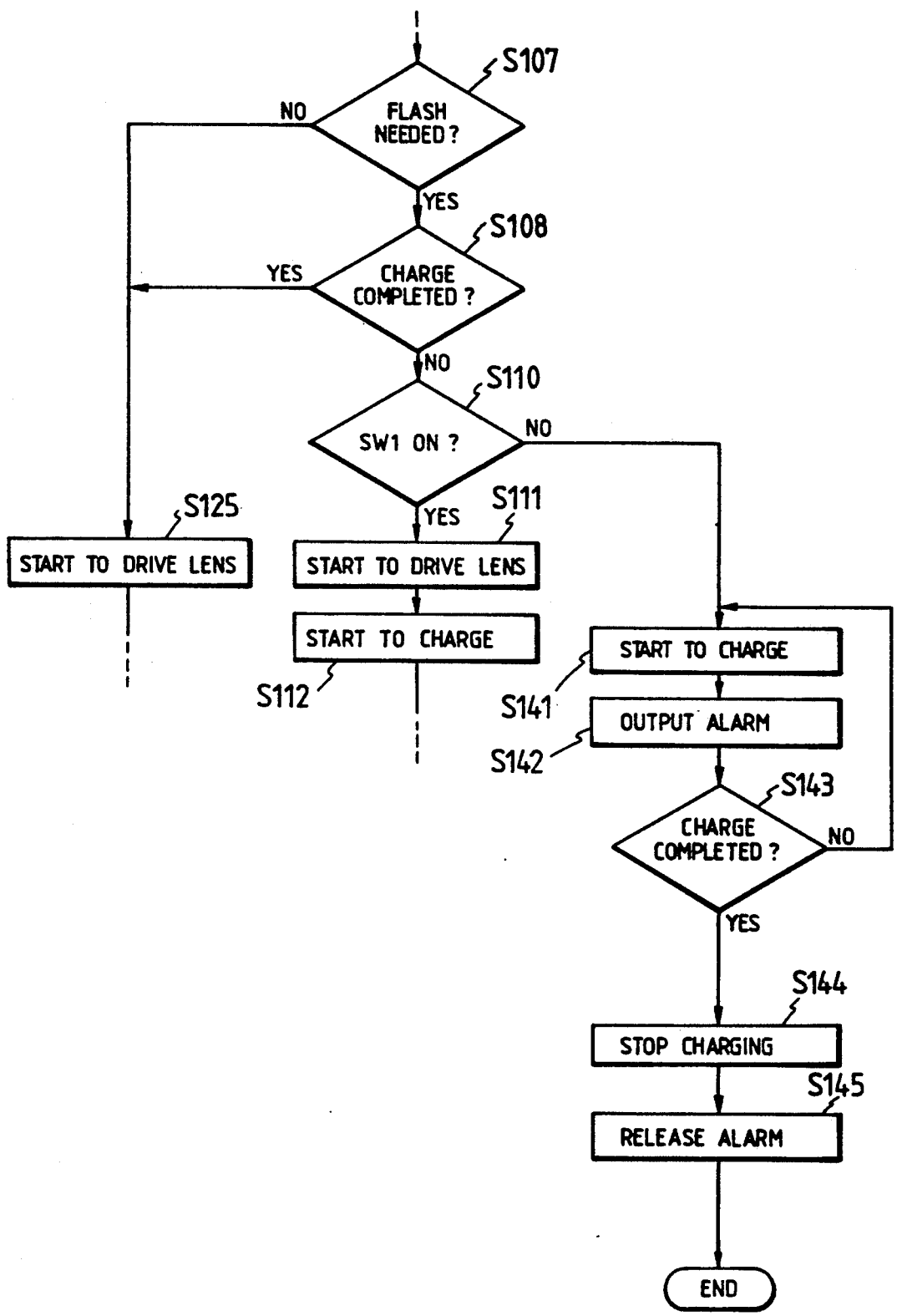

FIGS. 11 and 12 show modifications of the processing when the half depression switch SW1 is judged as being OFF at step S110.

(2) In FIG. 11, if step S108 is negated, an alarm of uncompleted charging is not output, but advance is made to step S110. At step S110, whether the half depression switch SW1 is closed is judged, and if the judgment is negative, there is a predetermined wait time at step S131, whereafter advance is made to step S132, where an alarm of uncompleted charging is output. Subsequently, at step S133, the charging is started, whereafter at step S134, whether the charging has been completed is judged. If the judgment is affirmative, advance is made to step S136, and if the judgment is negative, at step S135, whether the half depression switch SW1 is closed is judged. If step S135 is affirmed, return is made to step S132, and if step S135 is negated, advance is made to step S136. At step S136, the above-mentioned alarm is stopped, whereafter at step S137, the charging is stopped and the processing is terminated.

According to the above-described processing, when the half depression switch SW1 is again closed within a predetermined time after the opening of the half depression switch SW1 at step S110, the alarm of uncompleted charging and the charging are continued. Accordingly, confirmation of the charged state can be readily accomplished.

(3) Also, in FIG. 12, if step S110 is negated, advance is made to step S141, where the charging is started, and then at step S142, an alarm of uncompleted charging is output, whereafter at step S143, whether the charging has been completed is judged. If the judgment is negative, return is made to step S141, and if the judgment is affirmative, the charging is stopped at step S144, and at step S145, the alarm is released and the processing is terminated.

According to the above-described processing, the charging is effected as a temporary measure even if the half depression switch SW1 is opened, and this is effective for the use of a lithium battery or the like which can be rapidly charged.

Figure 13B:
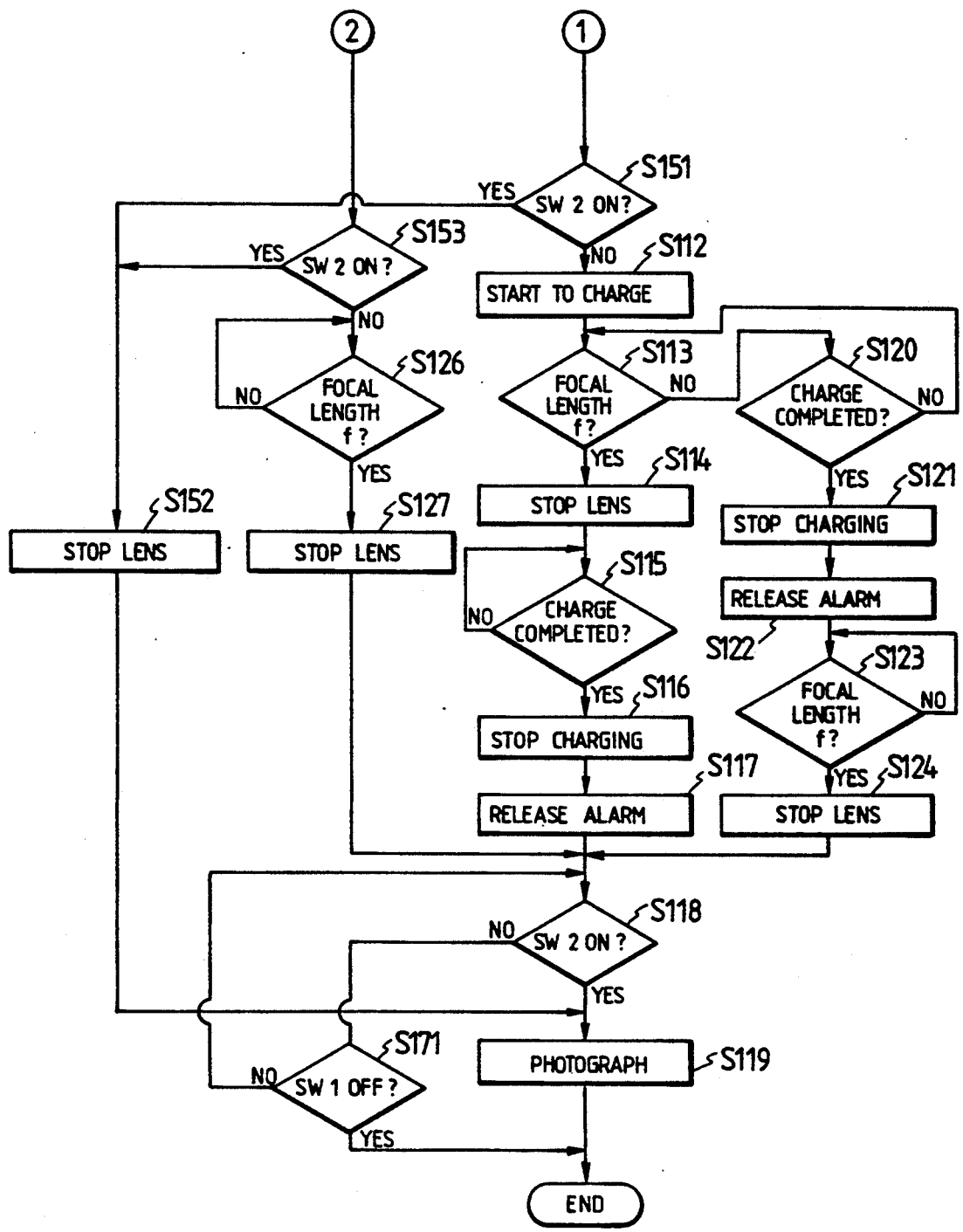
Figures 14, 14A:
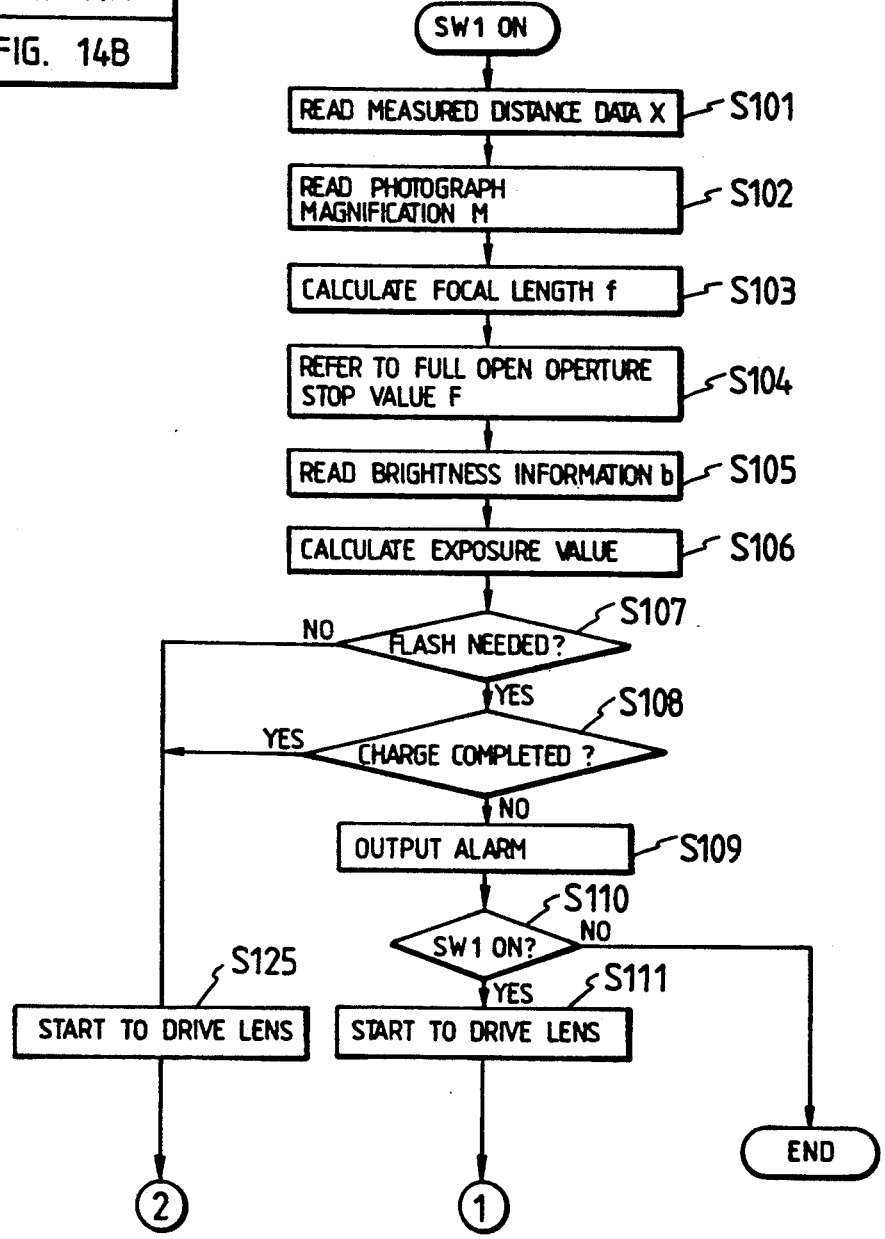

Further, FIGS. 13-14D show modifications of the timing of the release operation. In these figures, steps similar to those in FIGS. 10-10B are given similar reference characters.

(4) In FIGS. 13-13B, after the start of the lens driving at step S111, whether the full depression switch SW2 is closed is judged at step S151. If the judgment is negative, the processing of step S112 and subsequent steps (described in connection with FIGS. 10-10B) is effected, and if the judgment is affirmative, the driving of the zoom lens 99 is stopped at step S152 even if the focal length f is not reached, whereafter advance is made to step S119, where photographing is effected. If step S107 is negated or step S108 is affirmed, the driving of the zoom lens 99 is started at step S125, whereafter advance is made to step S153. At step S153, whether the full depression switch SW2 is closed as described above is judged, and if the judgment is negative, the processing of step S126 and subsequent steps is effected, and if the judgment is affirmative, the driving of the zoom lens 99 is stopped at step S152, whereafter the photographing operation is performed at step S119.

According to the above-described processing, if the full depression switch SW2 is closed after the driving of the zoom lens 99 toward the predetermined focal length f is started, photographing is effected in spite of the zoom lens 99 being not driven to a predetermined focus position and therefore, quickness of photographing can be secured. FIGS. 13C and 13D show a variation in which the NO line of the step S120 in FIG. 13B leads to the step S151, and the NO line of the step S126 leads to the step 153. Consequently, the discrimination of the step S151 or S153 is repeatedly executed in a period from the start of zooming in the step S111 or S125 in FIG. 13A to the identification of completed zooming in the step S113 or S126, so that the sequence can proceed to the termination of zooming (step S152) and the photographing operation (step S119) in response to the closing of the full depression switch SW2 at any time during the zooming.

Figure 14B:
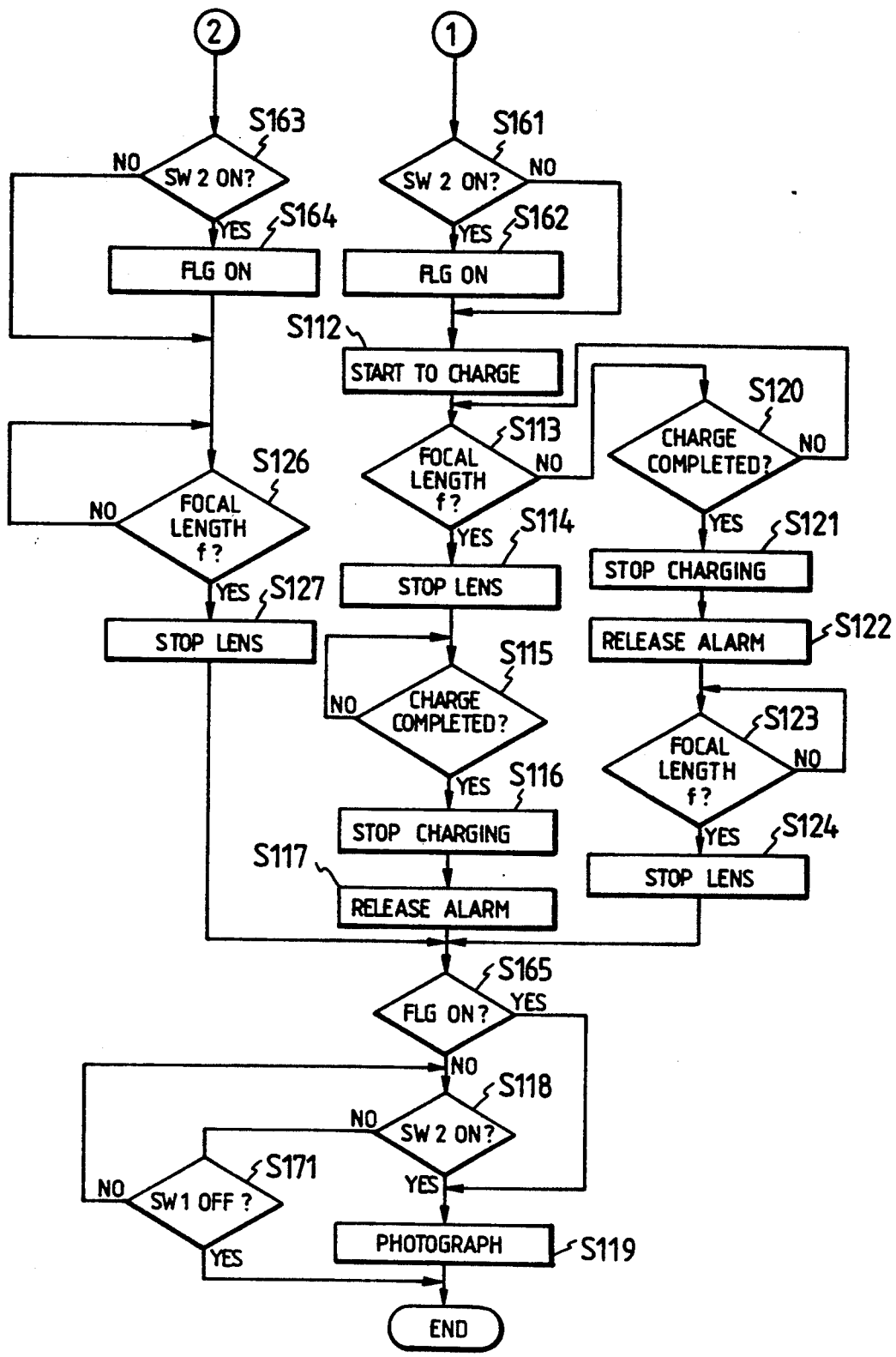

(5) Also, in FIGS. 14-14B, at step S111, the driving of the zoom lens 99 is started, whereafter at step S161, whether the full depression switch SW2 is closed is judged. If the judgment is negative, the processing of step S112 and subsequent steps is effected, and if the judgment is affirmative, the switch-on flag FLG is turned on at step S162, and advance is made to step S112. If step S107 is negated or step S108 is affirmed, the driving of the zoom lens 99 is likewise started at step S125, whereafter at step S163, whether the full depression switch SW2 is closed is judged, and if the judgment is negative, advance is made to step S126, and if the judgment is affirmative, the switch-on flag FLG is turned on at step S164, and advance is made to step S126. Further, at step S165, whether the switch-on flag FLG is ON is judged before the ON or OFF of the full depression switch SW2 is judged at step S118, and if the judgment is negative, advance is made to step S118, and if the judgment is affirmative, advance is made to step S119, where the photographing operation is performed.

According to the above-described procedure, if the full depression switch SW2 is closed after the driving of the zoom lens 99 is started and before the zoom lens 99 assumes the predetermined focal length f, this closed state is maintained until after the driving of the zoom lens is completed. FIGS. 14C and 14D show a variation in which the NO line of the step S120 in FIG. 14B leads to the step S161 and the NO line of the step S126 in FIG. 14B leads to the step S163. Consequently the discrimination of the step S161 or S163 is repeatedly executed in a period from the start of zooming in the step S111 or S125 in FIG. 14A to the identification of completed zooming in the step S114 or S126, so that the flag-on operation of the step S162 or S164 can be executed immediately in response to the closing of the full depression switch Sw2 at any time during the zooming. Accordingly, even if the user fully depresses the release button before the zoom lens 99 assumes the predetermined focal length f, and thereafter releases the finger from the release button, photographing will be effected after the driving of the zoom lens 99 is completed.

In the foregoing, there has been shown an example in which the focal length f of the zoom lens 99 is calculated on the basis of the measured distance data x output from the distance measurement circuit 92 and the present photograph magnification M and the full open aperture stop value F corresponding to said focal length f is used in the calculation of the exposure value, but for example, during so-called zoom continuous photography in which several focal lengths are set and input in advance and the zoom lens 99 is driven to the input focal length f and photographing is effected each time, a full open aperture stop value corresponding to said input and set focal length f may be found and may be used in the calculation of the exposure value.

Also, in the foregoing, a zoom lens has been described, but the present invention is applicable to any of photographing lenses which can accomplish photographing at a plurality of focal lengths.

According to the present invention, the exposure value is calculated on the basis of the full open aperture stop value corresponding to the focal length the photographing lens capable of photographing at a plurality of focal lengths should assume during the next photographing and the brightness information output from the photometry means, and after the calculation of the exposure value, the photographing lens is driven until it assumes said focal length and therefore, for example, the presence or absence of the necessity of flash light emission can be known before the photographing lens is driven and thus, the operability of the camera is improved.

Still another embodiment of the present invention will now be described with reference to FIGS. 16 and 17.

Figure 16:
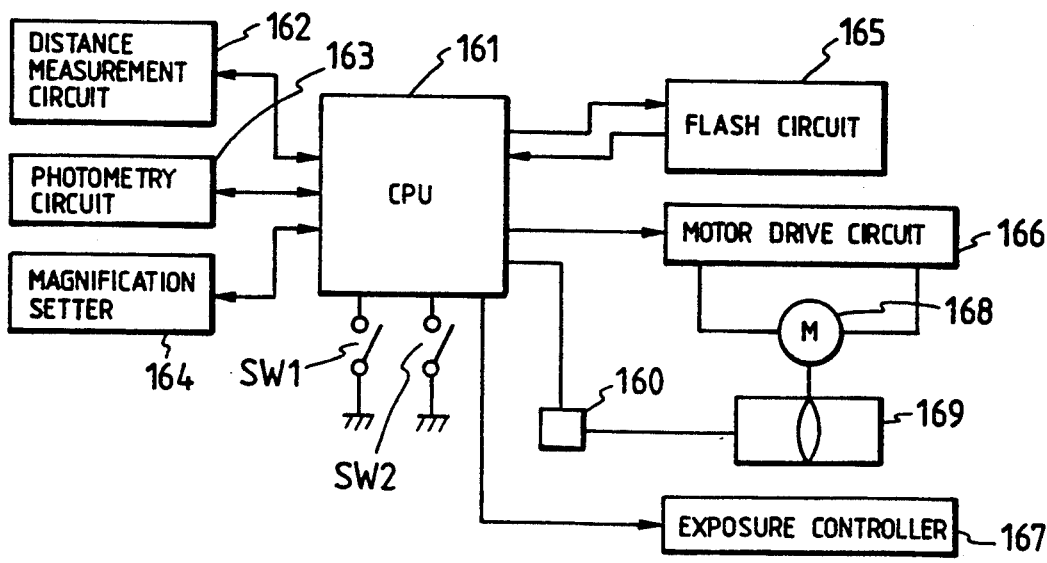
FIGS. 16 and 17 show an embodiment of the present invention, in greater detail FIG. 16 being a block diagram of a focal length controller for a camera according to the present invention, and FIG. 17 being a flow chart showing the processing procedure.

FIG. 16 is a block diagram of the focal length controller of a camera according to the present invention. A distance measurement circuit 162 and a photometry circuit 163 are connected to CPU 161. The distance measurement circuit 162 detects measured distance data according to the distance to an object and inputs it to the CPU 161, and the photometry circuit 163 detects brightness information regarding the brightness of the object and inputs it to the CPU 161.

Also connected to the CPU 161 are the flash circuit 165 of an electronic flash device, a motor drive circuit 166, an exposure control circuit 167 and a zoom encoder 160. The flash circuit 165 charges a light emitting capacitor, not shown, and causes the light emitting tube thereof to emit light by this charge. The motor drive circuit 166 controls a motor 168 and drives a photographing lens 169 to a predetermined focal length, and the position of this photographing lens 169 is detected by the zoom encoder 160. The exposure control circuit 167, as will be described later, drives an exposure control device such as a shutter and a stop, not shown, on the basis of the exposure value calculated in the CPU 161 and accomplishes photographing.

Further connected to the CPU 161 are switches SW1 and SW2 adapted to be closed in response to the operation of a release button, not shown. The switch SW1 is closed by the half depression of the release button, and the switch SW2 is closed by the full depression of the release button. When these switches SW1 and SW2 are closed, the CPU 161 controls the above-mentioned circuits and effects a series of photographing processes.

A magnification setter 164 is further connected to the CPU 161 and inputs to the CPU 161 a photograph magnification conforming to the object size input, for example, by a button operation. That is, the camera of the present embodiment is capable of given magnification photographing in which the object is photographed at a predetermined object size irrespective of the object distance, and a mode in which this given magnification photographing is accomplished by the operation of a given magnification setting button (the given magnification photograph mode) is set in the CPU 161. As regards the object size, for example, the so-called waist shot size in which the bust of the object (a person) is contained in the picture plane and the full shot size in which the whole body of the object is contained in the picture plane can be designated, and one of these object sizes is designated by the frequency of the operation of the above-mentioned given magnification setting button. The magnification setter 164 sets a photograph magnification corresponding to the designated object size and inputs it to the CPU 161.

The CPU 161, during the setting of the given magnification photograph mode, calculates the focal length of the photographing lens (zoom lens) 169 on the basis of the input photograph magnification and the object distance from the distance measurement circuit 162, and also calculates the exposure value from the full open aperture stop value of the photographing lens 169 corresponding to said focal length, the brightness information detected by the above-mentioned photometry circuit 163 and the film speed information. Whether the light emission (flash light emission) of the electronic flash device is necessary is judged on the basis of this exposure value, and if it is necessary, the focal length is changed as will be described later.

In the construction of the above-described embodiment, the photometry circuit 163 constitutes photometry means 153, the CPU 161 and the distance measurement circuit 162 together constitute focal length setting means 151, the CPU 161 constitutes judgment means 154, and the motor drive circuit 166 and the motor 168 together constitute drive means 152.

The control procedure of the camera by the CPU 161 will now be described with reference to the flow chart of FIG. 17.

Figure 17:
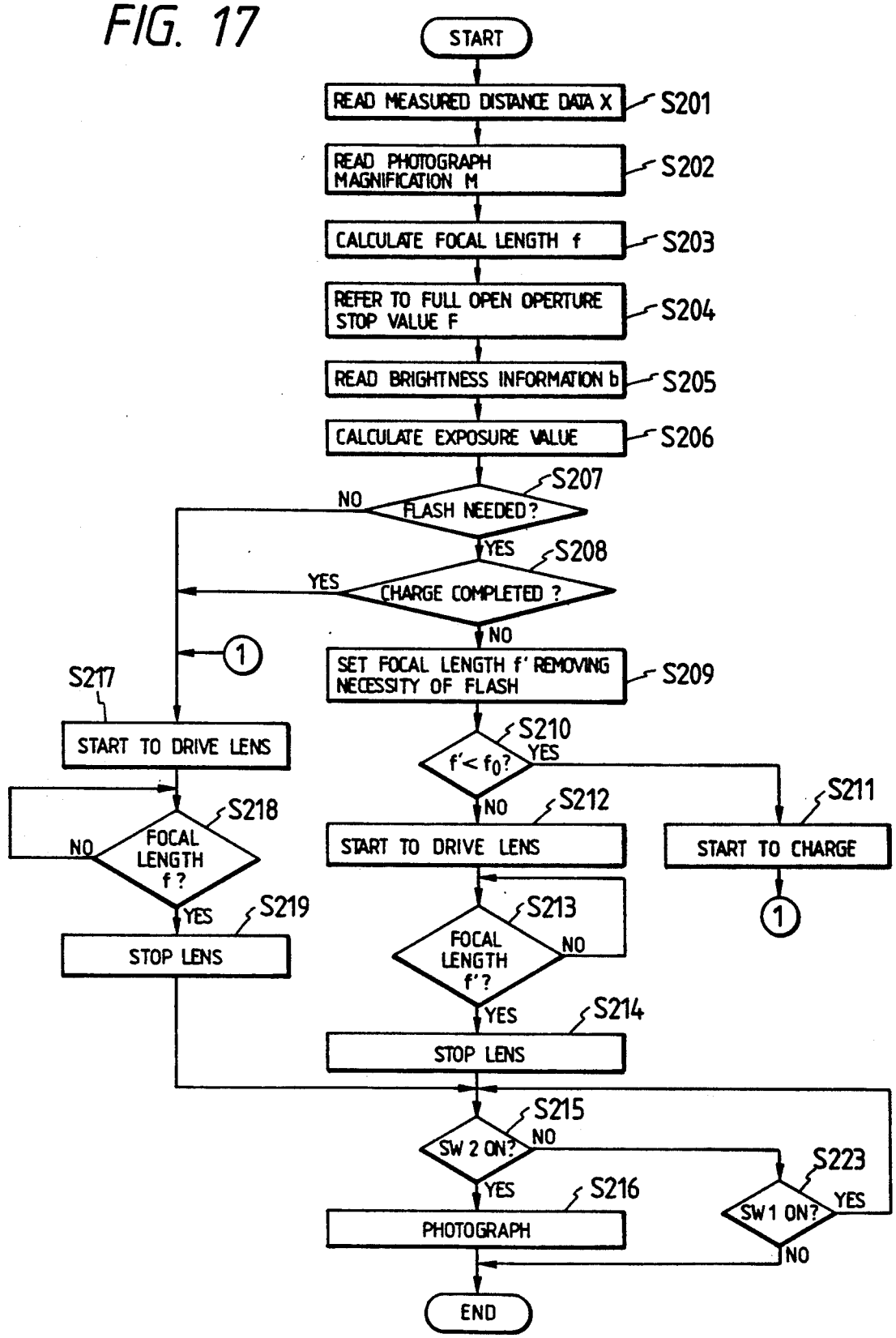

When the given magnification photograph mode and a desired object size are set by the operation of a given magnification photograph button and thereafter the switch SW1 is closed by the half depressing operation of a release button, the program of FIG. 17 is started and first, at step S201, measured distance data x representing the distance to the object obtained by the distance measurement circuit 162 is read. Subsequently, at step S202, a photograph magnification M corresponding to the object size set by the magnification setter 164 is read, and advance is made to step S203. At step S203, on the basis of the read measured distance data x and the photograph magnification M, the focal length f the photographing lens 169 should assume during the next photographing is calculated by f=M×x. Subsequently, at step S204, a full open aperture stop value F corresponding to the focal length f calculated at step S203 is selected from among a plurality of full open aperture stop values set and stored in advance in conformity with the focal lengths of the photographing lens 169. At step S205, brightness information b regarding the brightness of the object obtained by the photometry circuit 163 is read, and advance is made to step S206. At step S206, the exposure value is calculated on the basis of this brightness information b, the full open, aperture stop value F obtained at step S204, and further the film speed information, etc. The aperture value, the shutter speed, etc. are determined on the basis of this calculated exposure value.

At step S207, whether flash light emission is needed is judged. That is, when the shutter speed based on the calculated exposure value is higher than the camera-shake limit value of a preset shutter speed, it is judged that flash light emission is not needed, and when said shutter speed is equal to or lower than the camera-shake limit value, it is judged that flash light emission is needed. If step S207 is negated, at step S217, the photographing lens 169 starts to be driven toward the focal length f calculated at step S203, by the motor 168 through the motor drive circuit 166. Then, at step S218, whether the photographing lens 169 has reached this focal length f is judged from the output of the zoom encoder 160. If step S218 is negated, the program stays at step S218 until step S218 is affirmed, and if step S218 is affirmed, the photographing lens 169 is stopped at step S219, and advance is made to step S215.

If step S207 is affirmed, advance is made to step S208. At step S208, whether the charging of the light emitting capacitor is completed is judged, and if the judgement is negative, an alarm of uncompleted charging is output and advance is made to step S209, where a focal length f' removing the necessity of flash light emission is newly calculated and set. That is, as the focal length of the photographing lens 169 becomes greater, the full open aperture stop value thereof becomes greater and therefore, the shutter speed becomes correspondingly lower and the necessity of flash light emission increases. Accordingly, here, a focal length having such a full open aperture stop value that the shutter speed becomes higher than the camera-shake limit value, i.e., a focal length more toward the wide angle end side than the focal length set at first, is set. At step S216 which will be described later, photographing is effected on the basis of the then set shutter speed and the aperture value corresponding thereto.

For example, when the photographing lens 169 is at the telephoto end position, flash light emission becomes necessary for an exposure value (Ev value) of 11.5 Ev or less, and when the photographing lens 169 is at the wide angle position, flash light emission becomes necessary for an exposure value of 9.5 Ev or less. Assuming that the object brightness is b=5 (Bv) and the film speed is ISO100, the Ev value at this time is Ev10 and therefore, at the telephoto end position, flash light emission becomes necessary, but at the wide angle end position, flash light emission becomes unnecessary.

Then, at step S210, whether the newly set focal length f' is smaller than the focal length $f_0$ at the wide angle end of the photographing lens 169 is judged. If step S210 is affirmed, charging is started at step S211, whereafter advance is made to step S217, and at steps S217-S219, the photographing lens 169 is driven so that the focal length may assume the original value f calculated at step S203.

On the other hand, if step S210 is negated, at step S212, the photographing lens 169 starts to be driven toward the focal length f' calculated at step 209 by the motor 168 through the motor drive circuit 166. Then, at step S213, whether the photographing lens 169 has reached the focal length f' is judged from the output of the zoom encoder 160. If step S213 is negated, the program stays at step S213 until step S213 is affirmed, and if step S213 is affirmed, the photographing lens 169 is stopped at step S214, and advance is made to step S215.

At step S215, whether the full depression switch SW2 is closed is judged, and if the judgment is negative, advance is made to step S223. At step S223, whether the half depression switch SW1 is closed is judged, and if this switch is opened, this processing procedure is advanced to END to terminate the operation, and if the switch SW1 is closed, return is made to step S215. If step S215 is affirmed, advance is made to step S216, where photographing is effected. That is, the photographing lens 169 is first driven to a predetermined focusing position by a focusing motor, not shown, on the basis of the measured distance data x obtained at step S201, and then the stop and the shutter are driven to effect exposure on the basis of the exposure value set at step S206 or step S209, whereafter the processing is terminated. Also, during photographing, flash light emission is effected as required.

According to the above-described procedure, when it is judged at step S207 that the exposure value calculated at step S205 is a value which requires flash light emission and uncompleted charging is judged at step S208, the focal length is changed at step S209 so that flash light emission becomes unnecessary. Then, at steps S212-S214, the photographing lens is driven to the changed focal length, and at step S216, photographing is effected. However, if the changed focal length f' is smaller than the focal length $f_0$ at the wide angle end, flash light emission is necessary at any settable focal length and therefore, at step S211, the charging is started to effect flash photography, and the photographing lens 169 is driven so as to assume the focal length f before changed.

Another Embodiment

Figure 18:
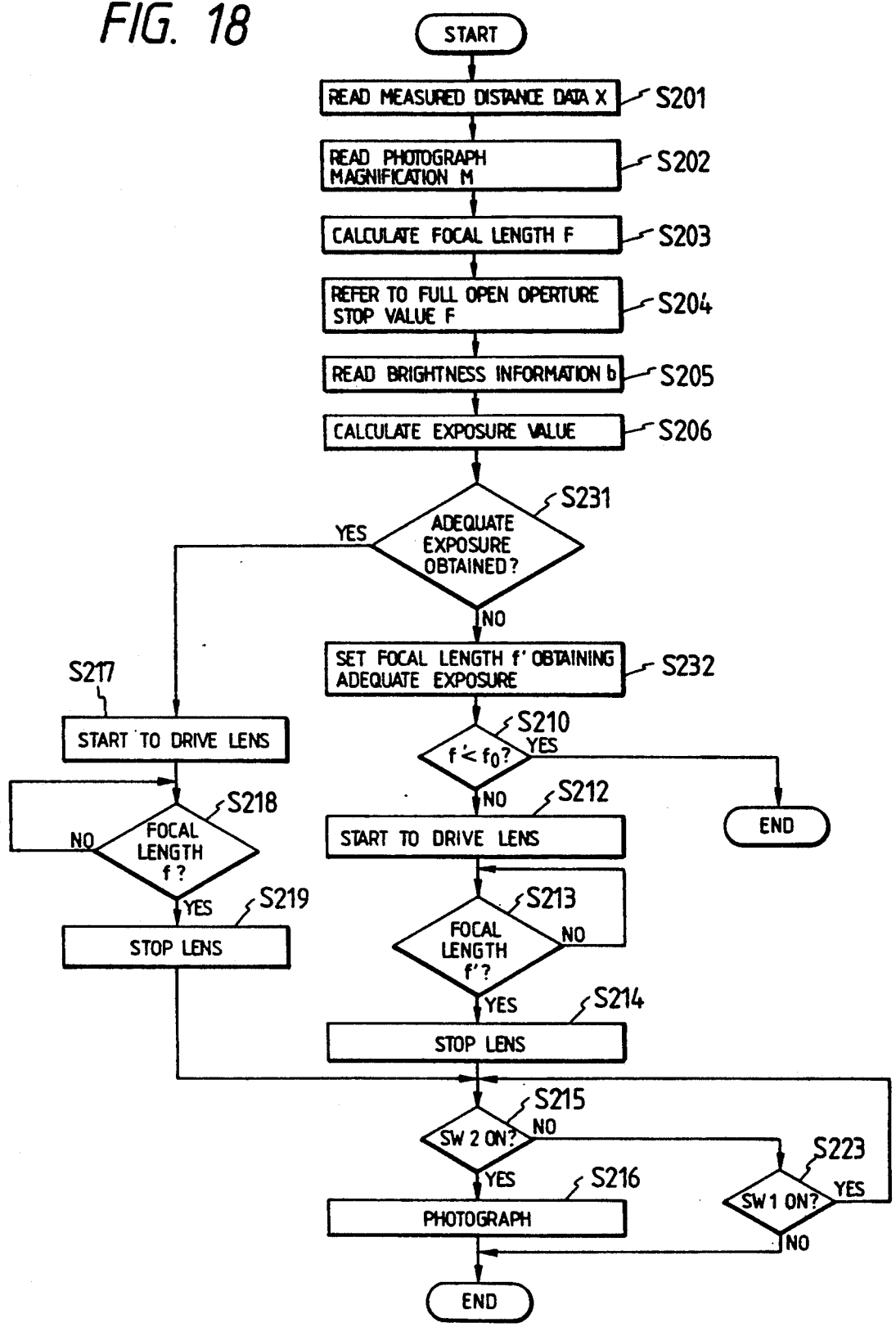
FIG. 18 is a flow chart of the processing procedure showing another embodiment.

In the foregoing, a camera provided with an electronic flash device has been described, and another embodiment using a camera which is not provided with an electronic flash device will now be described with reference to FIG. 18. In FIG. 18, steps similar to those in FIG. 17 are given similar reference characters, and only the differences between FIGS. 17 and 18 will hereinafter be described.

In FIG. 18, when the exposure value is calculated at step S206 as described above, advance is made to step S231, where whether adequate exposure is obtained when photographing is effected at this exposure value, that is, whether this exposure value is an adequate value, is judged. This is judged, for example, by whether the shutter speed based on the calculated exposure value is higher than the camera-shake limit value of the preset shutter speed. If step S231 is affirmed, advance is made to step S217, and if step S231 is negated, advance is made to step S232.

At step S232, a focal length f' for which adequate exposure can be obtained is newly set. That is, as described above, as the focal length of the photographing lens 169 becomes greater, the full open aperture stop value thereof becomes greater and therefore, the shutter speed becomes correspondingly lower. Accordingly, in such case, a focal length having such a full open aperture stop value that the shutter speed becomes higher than the camera-shake limit value, i.e., a focal length more toward the wide angle end side than the focal length set at first, is set.

Further, if step S210 is affirmed, adequate exposure is not obtained at any focal length and therefore, photographing is inhibited and the processing is terminated.

According to the above-described procedure, when it is judged that the calculated exposure value is an inadequate value, the focal length is changed so that adequate exposure may be obtained, and the photographing lens is driven to the changed focal length.

The judgment as to whether adequate exposure is obtained may be done depending on whether the calculated exposure value is within the range of the exposure value controllable in the camera. For example, when the aperture value based on this exposure value is greater than the full open aperture stop value of the focal length at that point of time, it may be judged that adequate exposure is not obtained.

Also, in the embodiments described above, given magnification photographing has been mentioned as calculating and setting the focal length which should be assumed during photographing on the basis of predetermined conditions, but this is not restrictive. The present invention is also applicable when effecting, for example, so-called zoom continuous photography in which several focal lengths are set and input in advance and the photographing lens 169 is driven to the input focal length f and photographing is effected each time, or so-called step zoom in which the photographing lens is driven to the focal length f input as described above each time the release button is half-depressed.

Also, in the foregoing, the present invention has been described with respect to a zoom lens, but the present invention is also applicable to any photographing lens capable of photographing at a plurality of focal lengths, such as a two-focus or three-focus lens.

Figure 15A:
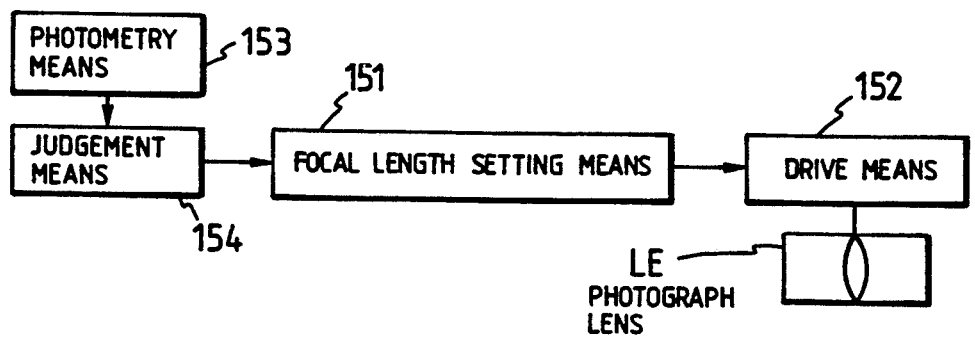
FIGS. 15A and 15B are block diagrams for broadly illustrating further embodiments of the invention.

According to the invention of FIG. 15A, when it is found that the light emission of the electronic flash device is necessary in a case where photographing is effected at a focal length calculated and set on the basis of predetermined photographing conditions, a focal length more toward the wide angle end side than said set focal length is newly calculated and set so that the light emission of the electronic flash device may become unnecessary and therefore, when effecting, for example, given magnification photographing, the object size set at first is changed, but photographing can be effected at adequate exposure without waiting for the charging time for light emission, and quickness of photographing can be secured.

Figure 15B:
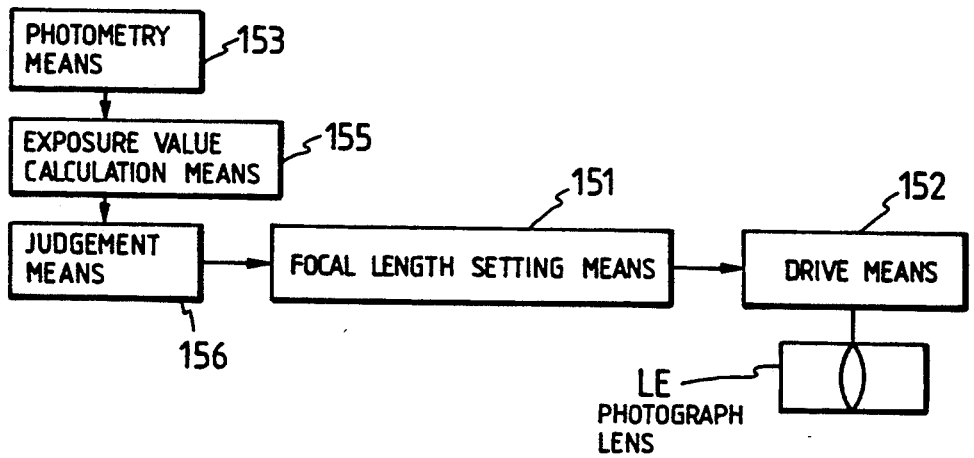

According to the invention of FIG. 15B, when it is judged that the exposure value is an inadequate value (a value at which adequate exposure is not obtained) in a case where, as described above, photographing is effected at the focal length calculated and set on the basis of predetermined photographing conditions, a focal length more toward the wide angle end side than said set focal length is newly calculated and set so that an adequate value (a value at which adequate exposure is obtained) may be obtained and therefore, when effecting, for example, given magnification photographing, the object size set at first is changed, but photographing can be effected at adequate exposure without giving up the photographing.

Yet still another embodiment of the present invention will now be described with reference to FIGS. 20–21B.

Figure 20:
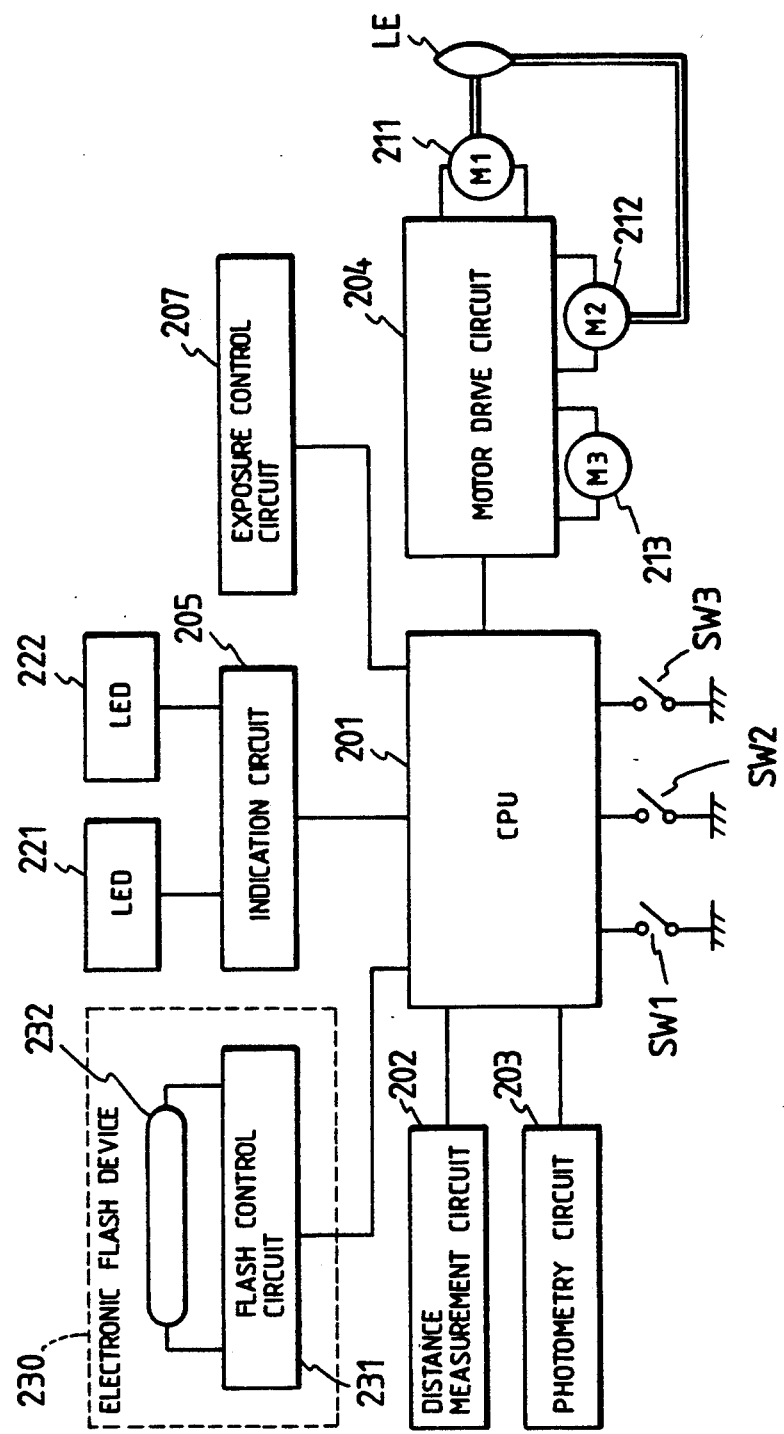
FIGS. 20, 21, 21A and 21B show an embodiment of the present invention, in greater detail FIG. 20 being a block diagram of a zooming controller for a camera according to the present invention, and FIGS. 21–21B being a flow chart showing the processing procedure.
Figures 21, 21A:
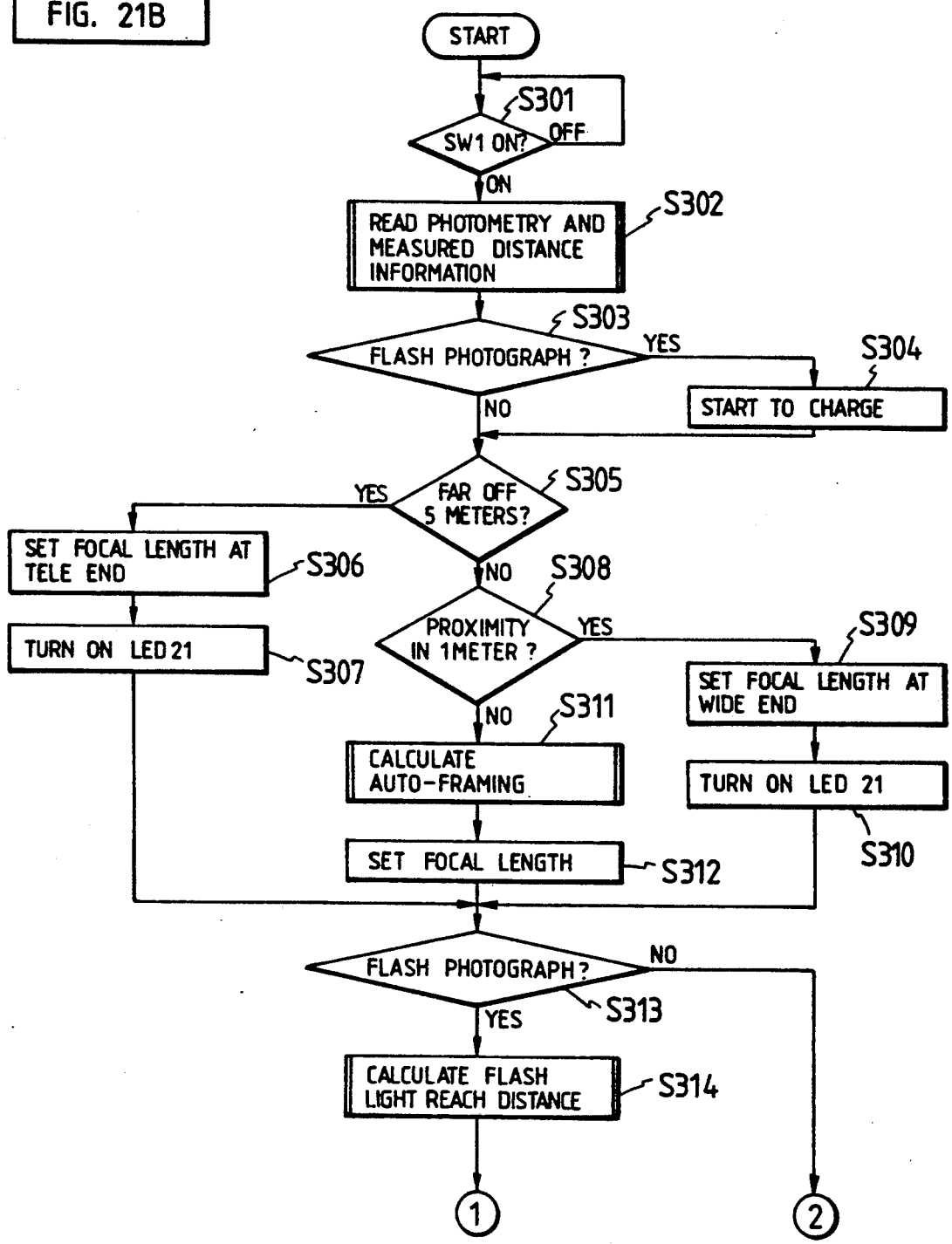
Figure 21B:
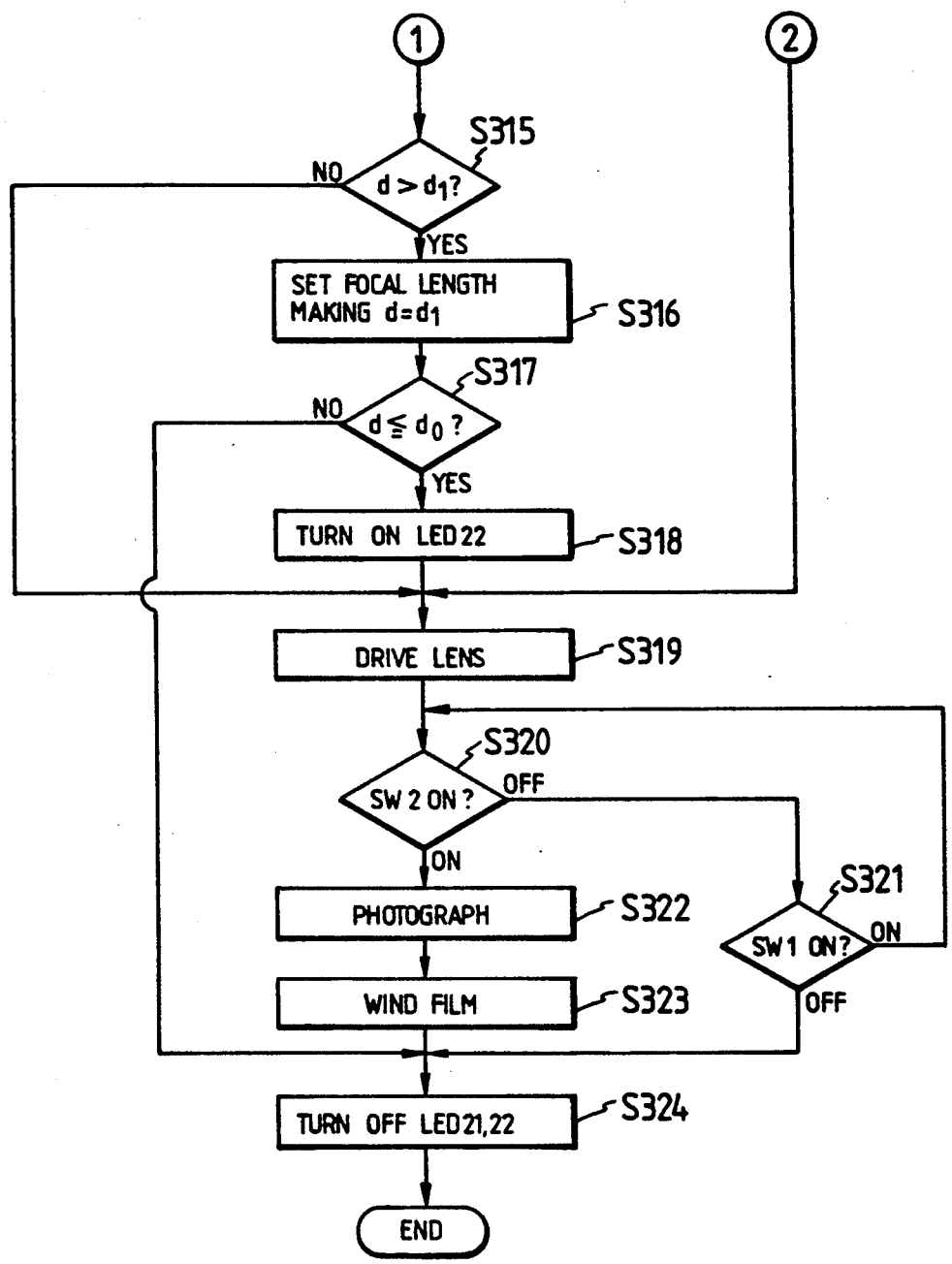

Referring to FIG. 20 which shows the entire construction, a distance measurement circuit 202 and a photometry circuit 203 are connected to CPU 201. The distance measurement circuit 202 detects distance information (object distance) according to the distance to an object and outputs it to the CPU 201, and the photometry circuit 203 detects brightness information regarding the brightness of the object and outputs it to the CPU 201.

Also connected to the CPU 201 are a motor drive circuit 204, an indication circuit 205, the flash control circuit 231 of an electronic flash device 230, an exposure control circuit 207 and switches SW1 and SW2, and connected to the motor drive circuit 204 are a zooming motor 211, a focusing motor 212 and a film winding motor 213. The motor drive circuit 204 drives a photographing lens (zoom lens) LE, to a predetermined focal length by the motor 211 in response to a zooming signal from the CPU 201. The photographing lens LE in the present embodiment has its focal length variable from 35 mm (Wide end) to 80 mm (Tele end). The motor drive circuit 204 also drives the photographing lens LE to a predetermined focusing position by the motor 212 in response to a focusing signal from the CPU 201, and also winds up the film by one frame by the motor 213 in response to a wind-up signal.

LED's 221 and 222 for indication in the viewfinder are connected to the indication circuit 205, and as will be described later, the LED's 221 and 222 are turned on in response to an indication signal from the CPU 201, thereby effecting various indications. The exposure control circuit 207 drives an exposure control device such as a stop and a shutter by a command from the CPU 201 to thereby effect photographing.

The flash control circuit 231 starts the charging of a light emitting main capacitor, not shown, in response to a charging start signal from the CPU 201 and also causes a light emitting tube 232 to emit light in response to a light emission start signal. The CPU 201 judges whether the use of the electronic flash device 230 is necessary, on the basis of the brightness information or the like from the photometry circuit 203, and when it judges that the use of the electronic flash device 230 is necessary, it outputs a charging start signal and also outputs a light emission start signal as photographing progresses.

The switches SW1 and SW2 are switches adapted to be closed in response to the operation of a release button, not shown, and the switch SW1 is closed by the half depression of the release button, and the switch SW2 is closed by the full depression of the release button. The CPU 201 operates the distance measurement circuit 202 and the photometry circuit 203 with the closing of the switch SW1, and effects focusing and photographing through the motor drive circuit 204 and the exposure control circuit 207 with the closing of the switch SW2.

Further connected to the CPU 201 is a switch SW3 adapted to be closed in response to the operation of an auto framing mode setting button, not shown, and the CPU 201 sets the auto framing mode with the closing of this switch SW3. The auto framing mode is a mode in which is effected auto framing photography (given magnification photography) in which the object is photographed always at a predetermined photograph magnification irrespective of the object distance detected by the distance measurement circuit 202, and this photograph magnification is set in the CPU 201 by the operation of the above-mentioned auto framing mode setting button. That is, in the CPU 201, there are pre-stored photograph magnifications corresponding to so-called waist shot size in which the bust of an object (a person) is contained in the picture plane and so-called full shot size in which the whole body of the object is contained in the picture plane. When the auto framing mode setting button is once depressed, the auto framing mode is set and the photograph magnification corresponding to the waist shot size is set, and when the auto framing mode setting button is depressed once more, the photograph magnification corresponding to the full shot size is set. When the auto framing mode setting button is depressed once again in this state, the auto framing mode is released.

During the setting of the auto framing mode, the CPU 201 calculates the focal length (a first focal length) f of the photographing lens LE on the basis of the set photograph magnification M and the object distance d from the distance measurement circuit 202, with the half depression of the release button, and drives the photographing lens LE so as to assume this focal length. That is, the photograph magnification M is calculated by $$M = \frac{f}{d} \quad (1)$$

and therefore, by substituting the photograph magnification M and the object distance d into equation (1), the focal length f for which the set photograph magnification M is obtained can be found.

Also, the CPU 201 calculates a flash reach distance $d_1$ from the guide number GN of the electronic flash device 230 and the full open F-value of the photographing lens LE when the light emission of the electronic flash device 230 is necessary during the setting of the auto framing mode. Generally, the guide number GN representing the amount of emitted light of the electronic flash device is given by $$GN = F_{NO} \times d_1 \quad (2)$$

where $F_{NO}$ is the full open F-value indicative of the brightness of the photographing lens LE, and in the case of a zoom lens, this full open F-value $F_{NO}$ varies in conformity with the focal length. That is, as the focal length becomes greater, the full open F-value $F_{NO}$ becomes darker.

The electronic flash device 230 has its guide number GN set to a predetermined value and accordingly, by substituting this guide number GN and the full open F-value $F_{NO}$ at any focal length f of the photographing lens LE into equation (2), the flash reach distance $d_1$ can be found. This flash reach distance $d_1$ is indicative of the object distance at which flash photography is possible, and when the above-mentioned object distance d is greater than the flash reach distance $d_1$, even if flash photography is effected, the flash will not sufficiently reach the object and under-exposure will occur.

So, during the setting of the auto framing mode, the CPU 201 changes the focal length of the photographing lens LE as will be described later if the object distance d is greater than the flash reach distance $d_1$.

The guide number GN shown in equation (2) above is a value when the film speed is ISO100, and where a film of any other film speed is used, the guide number GN shown in equation (2) need be multiplied by a predetermined coefficient to thereby effect conversion.

In the construction of the above-described embodiment, the distance measurement circuit 202 constitutes object distance detecting means 192, the CPU 201 constitutes full open F-value output means 194 and calculation means 195 and 295, and the CPU 201 and the motor drive circuit 204 together constitute lens drive control means 196 and 198.

The procedure of the auto framing photography by the CPU 201 will now be described with reference to the flow chart of FIGS. 21-21B.

This program shows the processing when the switch SW3 is once closed during the usual photography mode and the auto framing mode by the waist shot size is set, and first, at step S301, whether the half depression switch SW1 is closed is judged. If at step S301, the switch SW1 is opened, the program waits until the switch SW1 is closed, and when the switch SW1 is closed, at step S302, the object distance d is read from the distance measurement circuit 202 and brightness information is read from the photometry circuit 203. Then, at step S303, whether the light emission of the electronic flash device is needed is judged on the basis of the read brightness information. If step S303 is negated, advance is made to step S305, and if step S303 is affirmed, at step S304, a charging start signal is output to the flash control circuit to thereby cause this circuit to start charging, and then advance is made to step S305.

At step S305, whether the read object distance d exceeds 5 m is judged. Here, if the object distance d exceeds 5 m, even if the photographing lens LE is driven to the Tele end (focal length f32 80 mm), the waist shot size will not be obtained but an object size smaller than that will be provided. Accordingly, if step S305 is affirmed, at step S306, the focal length of the driven photographing lens LE is set to 80 mm, and at step S307, an indication signal is output to the indication circuit 205 to turn on LED 221, thereby effecting the indication to the effect that the waist shot size is not obtained, and advance is made to step S313.

If step S305 is negated, advance is made to step S308, where whether the object distance d is less than 1 m is judged. If the object distance d is less than 1 m, even if the photographing lens LE is driven to the Wide end (focal length f=35 mm), the waist shot size will not be obtained but an object size larger than that will be provided. Accordingly, if step S308 is affirmed, the focal length f of the driven photographing lens LE is set to 35 mm (Wide end) and also, at step S310, the LED 221 is turned on as described above, thereby effecting the indication to the effect that the waist shot size is not obtained, and advance is made to step S313.

If step S308 is negated, advance is made to step S311, where auto framing calculation is effected. That is, on the basis of the object distance d read at step S302 and the photograph magnification M conforming to the set waist shot size, the focal length f (a first focal length) of the photographing lens LE is calculated by equation (1) above, and then the focal length calculated at step S312 is set as the focal length of the driven photographing lens LE, and advance is made to step S313.

At step S313, whether the photography is flash photography using the electronic flash device 230 is judged, and if the judgment is negative, advance is made to step S319, and if the judgment is affirmative, advance is made to step S314. At step S314, the flash reach distance $d_1$ is calculated from the guide number GN of the electronic flash device and the full open F-value $F_{NO}$ conforming to the focal length f set at step S312, on the basis of equation (2) above. Then, at step S315, the object distance d read at step S302 is compared with the flash reach distance $d_1$. If $d \leq d_1$, advance is made to step S319, and if $d > d_1$, advance is made to step S316. At step S316, on the basis of equation (2), the full open F-value $F_{NO}$ of the photographing lens LE making $d = d_1$ is calculated, and the focal length f (a second focal length) having this full open F-value $F_{NO}$ is set as the focal length of the driven photographing lens LE.

Then, advance is made to step S317, where the object distance d is compared with a preset reference distance $d_0$, and if $d \leq d_0$, advance is made to step S318, and if $d > d_0$, the photograph magnification becomes much smaller than the photograph magnification conforming to the waist shot size set at first and therefore, advance is made to step S324, where LED's 221 and 222 are turned off to thereby terminate the processing. That is, in this case, photographing is inhibited.

At step S318, the LED 222 is turned on through the indication circuit 205 to thereby effect the indication to the effect that the focal length f of the photographing lens LE has been re-set (step S316), and then advance is made to step S319. At step S319, a zooming signal is output to the motor drive circuit 204 to drive the photographing lens LE to the focal length f set at one of steps S306, S309, S312 and S316. Thereby, the motor drive circuit 204 drives the photographing lens LE to the predetermined focal length f by the motor 211.

Then, at step S320, whether the full depression switch SW2 is closed is judged, and if the judgment is negative, advance is made to step S321. At step S321, whether the half depression switch SW1 is closed is judged, and if the judgment is affirmative, return is made to step S320, and if the judgment is negative, advance is made to step S324. If step S320 is affirmed, advance is made to step S322, and the exposure control device such as the stop and the shutter is driven through the exposure control circuit 207 to effect photographing, and at this time, the electronic flash device is caused to emit light as required. Thereafter, at step S323, a wind-up signal is output to the motor drive circuit 204, whereby the film is wound up by one frame by the motor 213, and at step S324, the LED's 221 and 222 are turned off to terminate the processing.

The above-described procedure will be described more specifically.

Let it be assumed that at step S302, for example, the object distance $d = 4$ m is obtained and as a result of the auto framing calculation at step S311, the focal length (a first focal length) $f = 70$ mm to which the photographing lens LE should be driven has been obtained. Let it also be assumed that the full open F-value of the photographing lens LE of this camera is $F_{NO} = 7$ at the focal length $f = 70$ mm and the guide number of the electronic flash device is $GN = 20$. Accordingly, by substituting $GN = 20$ and $F_{NO} = 7$ into equation (2), the flash reach distance $d_1 = 2.86$ m is obtained at step S314. At this time, the object distance is $d = 4$ m and therefore, if photographing is effected at the focal length $f = 70$ mm, an under-exposed photograph will be taken due to the insufficiency of the quantity of light.

According to the above-described processing procedure, in such a case, step S315 is affirmed and therefore, at step S316, $G = 20$ and $d_1 = 2.86$ are substituted into equation (2) to obtain $F_{NO} = 5$, and a second focal length (e.g. $f = 50$ mm) making $F_{NO} = 5$ is newly set. At step S319, the photographing lens LE is driven to this focal length f. Thereby, the photograph magnification becomes smaller than the waist shot size set at first, but under-exposed photographs are prevented from being taken.

In the foregoing, the description is with respect to the case of auto framing photography, but the present invention is also applicable to an ordinary zoom camera which does not have the auto framing mode. That is, when effecting flash photography at any focal length, the flash reach distance is calculated from the full open F-value of the photographing lens corresponding to this focal length and the guide number of the electronic flash device, and when the object distance is greater than the flash reach distance, a focal length having a full open F-value for which the flash reach distance is greater than the object distance may be set, and the zoom lens may be driven so as to assume this focal length, whereby photographing may be effected.

Figure 19A:
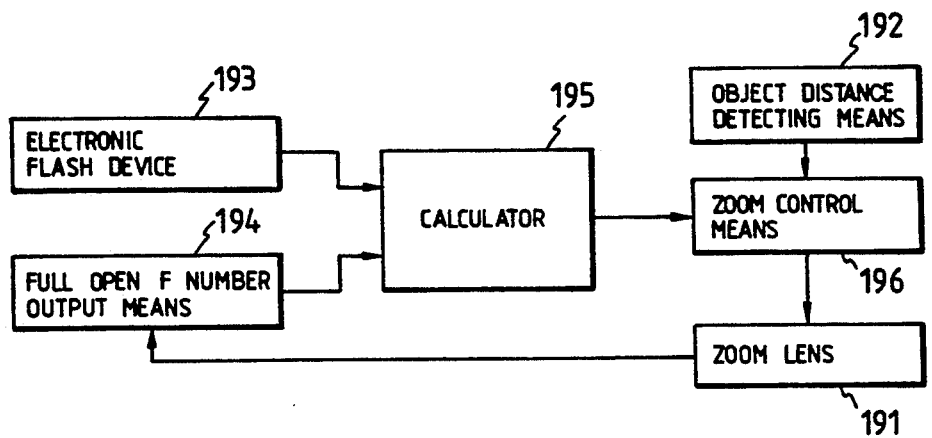
FIGS. 19A and 19B are block diagrams for broadly illustrating additional embodiments of the invention.

According to the invention of FIG. 19A, if during flash photography, the object distance is greater than the flash reach distance, a focal length having a full open F-value for which the flash reach distance is greater than the object distance is set and the zoom lens is driven so as to assume this focal length and therefore, under-exposed photographs are prevented from being taken.

Figure 19B:
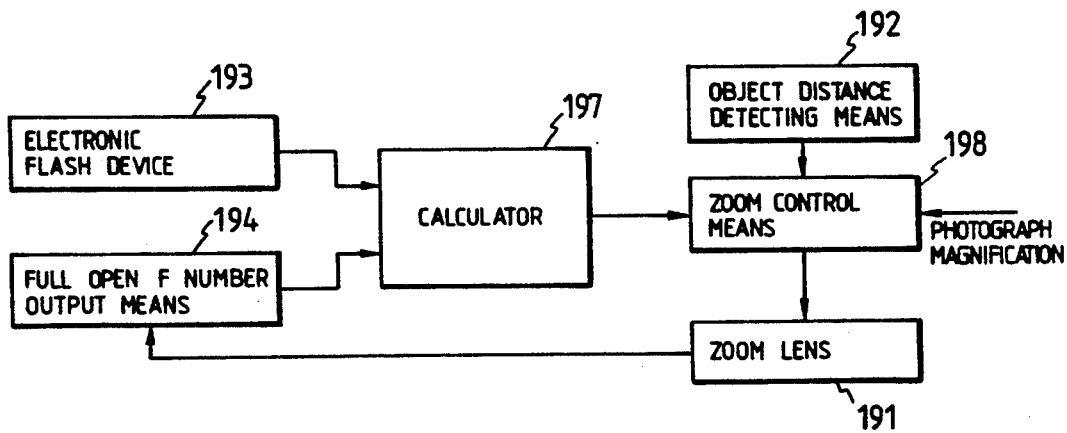

According to the invention of FIG. 19B, if during auto framing photography (given magnification photography), the object distance detected when a first focal length is set is greater than the flash reach distance based on the full open F-value conforming to the first focal length, a second focal length having a full open F-value for which the flash reach distance is greater than the object distance is set and the zoom lens is driven so as to assume the second focal length and therefore, even during auto framing photography, under-exposed photographs are prevented from being taken.

We claim:

1. A camera comprising:
    a photographing lens capable of zooming;
    a photographing operation member to be manually operated to a half depression or a full depression;
    first operation signal generating means for generating a first operation signal in response to manual operation of said photographing operation member to a half depression;
    first zoom signal generating means for generating a first zoom signal in response to said first operation signal;
    zooming means for electrically zooming said photographing lens in response to said first zoom signal and terminating said zooming when said photographing lens is brought to a predetermined focal length;
    second operation signal generating means for generating a second operation signal in response to manual operation of said photographing operation member to a full depression; and photographing means for recording a photographing frame formed by said photographing lens on a recording medium, in response to said second operation signal.

2. A camera according to claim 1, further comprising:
manually controlled zoom operation means for generating a second zoom signal;
wherein said zooming means is responsive to said second zoom signal for performing electric zooming of said photographing lens that terminates upon termination of said second zoom signal.

3. A camera according to claim 1, wherein said zooming means is adapted to continue said zooming once it is started in response to said first zoom signal, even if manual operation of said photographing operation member to said half depression is interrupted in the course of said zooming.

4. A camera according to claim 1, wherein said photographing means is non-responsive to said second operation signal during said zooming by said zooming means in response to said first zoom signal.

5. A camera according to claim 1, wherein:
when said second operation signal is generated in the course of said zooming by said zooming means in response to said first zoom signal, said zooming means immediately terminates said zooming; and
said photographing means effects said recording immediately thereafter in response to said second operation signal.

6. A camera according to claim 1, wherein:
if said second operation signal is generated at the completion of said zooming by said zooming means in response to said first zoom signal, said photographing means effects said recording immediately thereafter in response to said second operation signal.

7. A camera comprising:
a photographing lens capable of zooming;
a photographing operation member to be manually operated;
first operation signal generating means for generating a first operation signal in response to manual operation of said photographing operation member;
first zoom signal generating means for generating a first zoom signal in response to said first operation signal;
zooming means for electrically zooming said photographing lens in response to said first zoom signal and terminating said zooming when said photographing lens is brought to a predetermined focal length;
second operation signal generating means for generating a second operation signal in response to manual operation of said photographing operation member;
photographing means for recording a photographing frame formed by said photographing lens on a recording medium, in response to said second operation signal;
manually controlled zoom operation means for generating a second zoom signal;
wherein said zooming means is responsive to said second zoom signal for performing electric zooming of said photographing lens that terminates upon termination of said second zoom signal;
zoom mode setting means for setting one of plural zoom modes including at least first and second zoom modes, wherein, in said first zoom mode, said zooming means responds at least to said first zoom signal, and, in said second zoom mode, said zooming means is nonresponsive to said first zoom signal but responds to said second zoom signal; and
manually actuated first switching means for generating a first switching signal;
wherein said zoom mode setting means is adapted to switch between said first and second zoom modes in response to said first switching signal;
and wherein said photographing means is responsive to said second operation signal for recording a photographing frame formed by said photographing lens on a recording medium irrespective of the zoom mode set by said zoom mode setting means.

8. A camera comprising:
a photographing lens capable of zooming;
a photographing operation member to be manually operated;
first operation signal generating means for generating a first operation signal in response to manual operation of said photographing operation member;
first zoom signal generating means for generating a first zoom signal in response to said first operation signal;
zooming means for electrically zooming said photographing lens in response to said first zoom signal and terminating said zooming when said photographing lens is brought to a predetermined focal length;
second operation signal generating means for generating a second operation signal in response to manual operation of said photographing operation member;
photographing means for recording a photographing frame formed by said photographing lens on a recording medium, in response to said second operation signal;
manually controlled zoom operation means for generating a second zoom signal;
wherein said zooming means is responsive to said second zoom signal for performing electric zooming of said photographing lens that terminates upon termination of said second zoom signal;
zoom mode setting means for setting one of plural zoom modes including at least first and second zoom modes, wherein, in said first zoom mode, said zooming means responds at least to said first zoom signal, and, in said second zoom mode, said zooming means is nonresponsive to said first zoom signal but responds to said second zoom signal;
manually actuated first switching means for generating a first switching signal;
wherein said zoom mode setting means is adapted to switch between said first and second zoom modes in response to said first switching signal; and
wherein:
said zooming means also responds to said second zoom signal when said first zoom mode is set;
said camera further comprises second switching means for generating a second switching signal when said second zoom signal is generated while said first zoom mode is set; and
said zoom mode setting means is adapted to switch from said first zoom mode to said second zoom mode in response to said second switching signal and to prohibit the response of said zooming means to the first operation signal if it is generated thereafter.

9. A camera according to claim 8, wherein, if said first switching signal is generated after the switching from said first zoom mode to said second zoom mode in response to said second switching signal, said zoom mode setting means is adapted to switch from said second zoom mode to said first zoom mode.

10. A camera according to claim 8, further comprising:
third switching means for generating a third switching signal when said second operation signal is generated after the switching from the first zoom mode to the second zoom mode in response to said second switching signal, wherein said zoom mode setting means is adapted to switch from the second zoom mode to the first zoom mode in response to said third switching signal.

11. A camera according to claim 8, further comprising:
further switching means for generating a further switching signal when said photographing means is operated after the switching from the first zoom mode to the second zoom mode in response to said second switching signal, wherein said zoom mode setting means is adapted to switch from the second zoom mode to the first zoom mode in response to said further switching signal.

12. A camera according to claim 11, further comprising:
further switching means for generating a further switching signal when said photographing means is operated after the switching from the first zoom mode to the second zoom mode in response to said second switching signal, wherein said zoom mode setting means is adapted to switch from the second zoom mode to the first zoom mode in response to said further switching signal.

13. A camera comprising:
a photographing lens capable of zooming;
a photographing operation member to be manually operated;
first operation signal generating means for generating a first operation signal in response to manual operation of said photographing operation member;
first zoom signal generating means for generating a first zoom signal in response to said first operation signal;
zooming means for electrically zooming said photographing lens in response to said first zoom signal and terminating said zooming when said photographing lens is brought to a predetermined focal length;
second operation signal generating means for generating a second operation signal in response to manual operation of said photographing operation member;
photographing means for recording a photographing frame formed by said photographing lens on a recording medium, in response to said second operation signal;
object distance detecting means for generating an object distance signal corresponding to the distance to an object to be photographed; and
focal length setting means for setting said predetermined focal length, according to said object distance signal, so that the size of said object becomes substantially constant with respect to the photographing frame regardless of the object distance;
wherein said zooming means effects the zooming of said photographing lens to the set predetermined focal length in response to said first zoom signal.

14. A camera according to claim 13, wherein:
said object distance detecting means is adapted to detect said object distance in response to said first operation signal.

15. A camera comprising:
a photographing lens capable of zooming;
a photographing operation member to be manually operated;
first operation signal generating means for generating a first operation signal in response to manual operation of said photographing operation member;
first zoom signal generating means for generating a first zoom signal in response to said first operation signal;
zooming means for electrically zooming said photographing lens in response to said first zoom signal and terminating said zooming when said photographing lens is brought to a predetermined focal length;
second operation signal generating means for generating a second operation signal in response to manual operation of said photographing operation member; and
photographing means for recording a photographing frame formed by said photographing lens on a recording medium, in response to said second operation signal;
object distance detecting means for generating an object distance signal corresponding to the distance to an object to be photographed in response to said first operation signal;
focal length setting means for setting said predetermined focal length, according to said object distance signal, so that the size of said object with respect to the photographing frame becomes substantially constant regardless of the object distance;
wherein said zooming means is adapted to effect zooming of said photographing lens to the set predetermined focal length in response to said first zoom signal;
wherein said object distance detecting means generates an object distance signal again after the completion of zooming in response to said first zoom signal and before the start of recording by said photographing means; and
focusing means for focusing said photographing lens according to the last-mentioned object distance signal.

16. A camera comprising:
a photographing lens capable of zooming;
a photographing operation member to be manually operated;
first operation signal generating means for generating a first operation signal in response to manual operation of said photographing operation member;
first zoom signal generating means for generating a first zoom signal in response to said first operation signal;
zooming means for electrically zooming said photographing lens in response to said first zoom signal and terminating said zooming when said photographing lens is brought to a predetermined focal length;
second operation signal generating means for generating a second operation signal in response to manual operation of said photographing operation member;

photographing means for recording a photographing frame formed by said photographing lens on a recording medium, in response to said second operation signal; and manually controlled zoom operation means for generating a second zoom signal;

wherein said zooming means is responsive to said second zoom signal for performing electric zooming of said photographing lens that terminates upon termination of said second zoom signal; and wherein:

if said second zoom signal is generated in the course of said zooming by said zooming means in response to said first zoom signal, said zooming means is adapted to immediately interrupt said zooming; and said zooming means is adapted to effect said zooming in response to said second zoom signal immediately thereafter.

17. A camera comprising:

a photographing lens capable of zooming;

a photographing operation member to be manually operated;

first operation signal generating means for generating a first operation signal in response to manual operation of said photographing operation member;

object distance detecting means for generating an object distance signal corresponding to the distance to an object to be photographed, in response to said first operation signal;

focal length setting means for setting the focal length of said lens, according to said object distance signal, so that the size of said object with respect to a photographing frame formed by said photographing lens becomes substantially constant regardless of the object distance;

first zoom signal generating means for generating a first zoom signal in response to said first operation signal;

manually controlled zoom operation means for generating a second zoom signal;

zooming means for electrically zooming said photographing lens in response to said first zoom signal and terminating said zooming when said photographing lens is brought to the focal length set by said focal length setting means, wherein said zooming means is responsive to said second zoom signal for performing electric zooming of said photographing lens that terminates upon termination of said second zoom signal;

zoom mode setting means for setting one of plural zoom modes including at least first and second zoom modes, wherein, in said first zoom mode, said zooming means responds to said first and second zoom signals, and, in said second zoom mode, said zooming means is non-responsive to said first zoom signal but responds to said second zoom signal;

manually actuated first switching means for generating a first switching signal, wherein said zoom mode setting means is adapted to switch between said first and second zoom modes in response to said first switching signal;

second switching means for generating a second switching signal if said second zoom signal is generated while said first zoom mode is set, wherein said zoom mode setting means is adapted to switch from said first zoom mode to the second zoom mode in response to said second switching signal and to prohibit the response of said zooming means to said first operation signal which may be generated thereafter;

second operation signal generating means for generating a second operation signal in response to manual operation of said photographing operation member; and photographing means for recording the photographing frame formed by said photographing lens, in response to said second operation signal.

18. A camera according to claim 17, wherein:

if said first switching signal is generated after the switching from said first zoom mode to said second zoom mode by said second switching signal, said zoom mode setting means is adapted to switch from said second zoom mode to said first zoom mode.

19. A camera according to claim 18, further comprising:

third switching means for generating a third switching signal when said second operation signal is generated after the switching from the first zoom mode to the second zoom mode in response to said second switching signal, wherein said zoom mode setting means is adapted to switch from the second zoom mode to the first zoom mode in response to said third switching signal.

20. A photographing method for a camera provided with a zoom lens, comprising, in succession, the following steps:

(a) electrically zooming said zoom lens to a predetermined focal length by manual actuation of a photographing operation control member, without performing a photographing operation;

(b) electrically zooming said zoom lens, set at said predetermined focal length, by manual actuation of a zooming operation control member;

(c) prohibiting, in response to step (b), repetition of step (a); and (d) effecting a photographing operation by manual actuation of said photographing operation control member.

21. A photographing method for a camera provided with a zoom lens, comprising, in succession, the following steps:

(a) detecting an object distance in response to manual actuation of a photographing operation control member, without performing a photographing operation;

(b) selecting a focal length at which said zoom lens is to be set, according to the detected object distance;

(c) electrically zooming said zoom lens to the selected focal length;

(d) electrically zooming said zoom lens, set at said selected focal length, by manual actuation of a zooming operation control member;

(e) prohibiting, in response to step (d), repetition of step (c); and (f) effecting a photographing operation by manual actuation of said photographing operation control member.

22. A camera comprising:

a photographing lens which is movable and is capable of varying the state of a photographing frame formed by said lens, by said movement;

a photographing operation member to be manually operated;

first operation signal generating means for generating a first operation signal in response to manual operation of said photographing operation member;

object distance detecting means for generating an object distance signal corresponding to the distance to an object to be photographed, in response to said first operation signal;

lens position determining means for determining the position of said photographing lens at a next photographing operation according to said object distance signal;

first lens drive signal generating means for generating a first lens drive signal in response to said first operation signal;

manually operable second lens drive signal generating means for generating a second lens drive signal for the duration of a manual operation thereof;

lens driving means for electrically driving said photographing lens in response to said first lens drive signal and terminating said driving when said photographing lens reaches the position determined by said lens position determining means, wherein said lens driving means is adapted to effect electrical driving of said photographing lens during said second lens drive signal and to terminate such driving when the generation of said second lens drive signal is terminated;

lens drive mode setting means for selecting one of plural lens drive modes which include at least first and second lens drive modes, wherein, in said first lens drive mode, said lens drive means responds to said first and second lens drive signals, and, in said second lens drive mode, said lens drive means is nonresponsive to said first lens drive signal but responds to said second lens drive signal;

first switching means for generating a first switching signal in response to a manual operation, wherein said lens drive mode setting means is adapted to switch between said first and second lens drive modes in response to said first switching signal;

second switching means for generating a second switching signal when said second lens drive signal is generated while said first lens drive mode is set, wherein said lens drive mode setting means is adapted to switch from said first lens drive mode to said second lens drive mode in response to said second switching signal and to prohibit the response of said lens drive means to said first operation signal which may be generated thereafter;

second operation signal generating means for generating a second operation signal in response to manual operation of said photographing operation member; and photographing means for recording the photographing frame formed by said photographing lens, in response to said second operation signal.

23. A camera according to claim 22, wherein said lens driving means drives the photographing lens for zooming.

24. A camera comprising:

a photographing lens capable of zooming;

a photographing operation member to be operated by a manual operation that includes a first manual operation part and a second manual operation part conducted after said first manual operation part;

first operation signal generating means for generating a first operation signal in response to said first manual operation part;

light metering means for generating a brightness signal corresponding to the brightness of an object, in response to said first operation signal;

focal length setting means for generating a focal length signal corresponding to a focal length to be assumed by said photographing lens at a next photographing operation, in response to said first operation signal;

flash requirement discriminating means for discriminating whether a flash emission is needed at the next photographing operation, based on said brightness signal and said focal length signal, and generating a flash needed signal if the flash emission is needed;

charging completion detecting means for detecting, in response to said flash needed signal, whether the charging of a capacitor for flash emission has been completed, and generating a charging uncompleted signal if said charging is not yet completed;

display means for providing a display in response to said charging uncompleted signal;

first zoom signal generating means for generating a first zoom signal after the discrimination by said flash requirement discriminating means, or, if said charging uncompleted signal is generated, after the display by said display means;

zooming means for electrically zooming said photographing lens in response to said first zoom signal, and terminating said zooming when said photographing lens is brought to the focal length to be assumed at the next photographing operation;

second operation signal generating means for generating a second operation signal in response to said second manual operation part of said photographing operation member; and photographing means for recording a photographing frame formed by said photographing lens, on a recording medium, in response to said second operation signal.

25. A camera according to claim 24, further comprising:

charging means for starting the charging of said capacitor in response to said charge uncompleted signal, said charging being continued even during the zooming by said zooming means.

* * * * *